US012375864B2

(12) United States Patent
Klinke et al.

(10) Patent No.: US 12,375,864 B2
(45) Date of Patent: Jul. 29, 2025

(54) METHOD AND SYSTEM OF AUDIO DEVICE PERFORMANCE TESTING

(71) Applicant: Intel Corporation, Santa Clara, CA (US)

(72) Inventors: Piotr Klinke, Szczecin (PL); Pawel Trella, Gdansk (PL); Damian Koszewski, Gdansk (PL); Pawel Pach, Gdansk (PL); Przemyslaw Maziewski, Gdansk (PL); Jan Banas, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 896 days.

(21) Appl. No.: 17/346,535

(22) Filed: Jun. 14, 2021

(65) Prior Publication Data

US 2021/0306782 A1 Sep. 30, 2021

(51) Int. Cl.
*H04R 29/00* (2006.01)
*G10L 25/60* (2013.01)

(52) U.S. Cl.
CPC ............ *H04R 29/004* (2013.01); *G10L 25/60* (2013.01)

(58) Field of Classification Search
CPC .............................. H04R 29/004; G10L 25/60
See application file for complete search history.

(56) References Cited

U.S. PATENT DOCUMENTS 7,158,643 B2 * 1/2007 Lavoie .................... H04S 7/301 381/59
2003/0009247 A1 * 1/2003 Wiser ............... G11B 20/10527
2014/0318213 A1 * 10/2014 Tsao ................... G01N 29/4436 73/1.86
2014/0355796 A1 * 12/2014 Xiang ..................... H04S 7/305 381/303
2016/0192096 A1 * 6/2016 Bentley ................ H04R 29/001 381/59
2018/0082692 A1 * 3/2018 Khoury ................... G10L 17/20
2020/0196053 A1 * 6/2020 Mansour ................ H04R 1/406

* cited by examiner

*Primary Examiner* — Daniel R Sellers
(74) *Attorney, Agent, or Firm* — Akona IP PC

(57) ABSTRACT

A method of audio device performance testing generates virtual audio device data packages.

25 Claims, 16 Drawing Sheets

1300

METHOD AND SYSTEM OF AUDIO DEVICE PERFORMANCE TESTING

BACKGROUND

Modern speech-enabled devices, such as laptops, tablets, smart phones, and smart speakers, often support multi-channel audio inputs. These devices often include two to eight microphones (or more) which are integrated into the device. During the development and manufacture of these devices, it is frequently useful to test the performance of the microphones including testing for quality assurance and/or function validation for various applications, such as automatic speech recognition or wake-on-voice applications. Testing the performance of the audio devices often involves obtaining certifications for specific audio application products, which requires testing an audio device's accuracy over a very large set of different speech samples presented in various real life acoustic environments physically recreated in multiple dedicated audio rooms. This process is time consuming and complex due to the need to re-test a device each time the software, hardware, and/or sometimes the physical arrangement of microphones is adjusted on the device or from prototype to prototype as the product development of the device progresses. This testing is performed while physically sending the same audio device being tested among the original equipment manufacturer (OEM) of the audio device and the separate software, hardware, and audio application developers to make adjustments and re-test the devices. This results in a very inefficient time consuming testing process.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
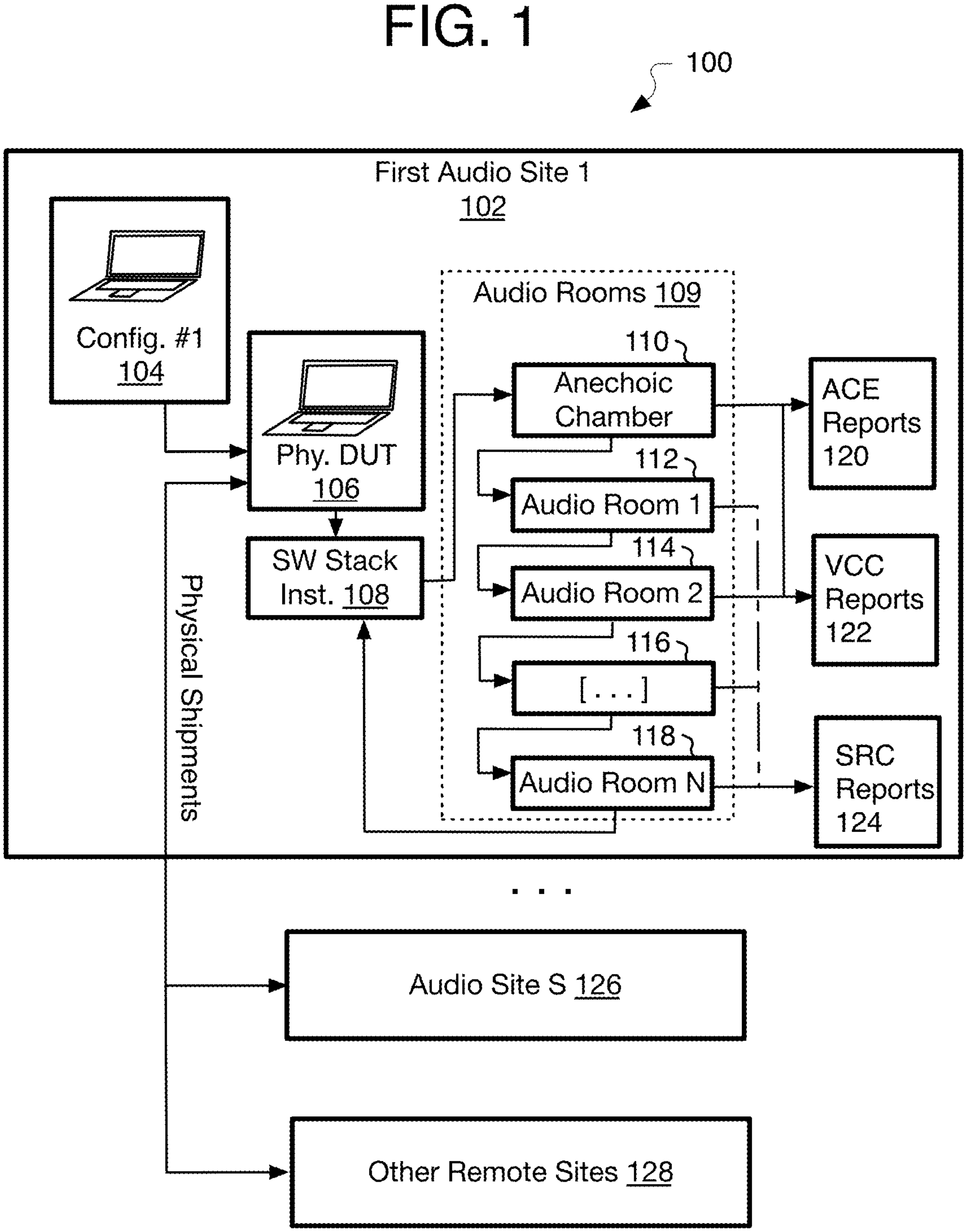
FIG. 1 is a schematic diagram of a conventional audio device testing system.

One or more implementations are now described with reference to the enclosed figures. While specific configurations and arrangements are discussed, it should be understood that this is performed for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or chip packages, and/or various computing devices such as laptops, tablets, servers, desk top computers, local or world-wide computer networks, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein also may be implemented as instructions stored on a machine-readable medium or memory, which may be read and executed by one or more processors formed by processor circuitry. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, mediums, and methods of audio device performance testing are described below.

The conventional over-the-air testing on the audio devices such as PCs, laptops, tablets, smartphones, smart speakers, speech-enabled home appliances, internet-of-things (IoT) devices, and so forth, involve emitting audio samples from speakers of an audio emitting device (or from a person), while a device under test (DUT) receives the audio at its microphones. The captured audio is provided to audio applications on the DUT to perform audio processing such as with automatic speech recognition (ASR) or other audio applications related to a personal assistant for example. The recognized speech is then compared to the ground truth to measure the accuracy (or quality or performance) of the ASR. To obtain certifications of specific applications, such as certain personal assistant certifications for Alexa, Cortana, Siri, and so forth, the testing verifies an audio-enabled device's performance in a setting that imitates a real user scenario very precisely. To accomplish this, the testing requires placing the DUTs in dedicated audio rooms with controlled acoustics in order to guarantee reproducibility and minimize the number of degrees of freedom in the tests.

Referring to FIG. 1, a conventional audio quality testing system 100 is shown where a first audio site 102, which may be an OEM site, uses a physical audio device under test (DUT or just audio device) 106 with a configuration #1 104 where the configuration may include specific position and orientation of speakers and microphones on a chassis and relative to each other. The configuration 104 also may include specific hardware, firmware, and software, and any adjustable software settings on the configuration. The DUT 106 also has a software stack 108 that includes the specific audio applications that are to be modified and adjusted depending on the test results. This may include ASR and wake-on-voice (WoV) applications as well as other applications that include speech recognition programs such as speaker recognition (SR).

The tests proceed with placing the DUT in audio rooms 109 and including an anechoic chamber 110 to derive direct acoustic output that does not include significant reverberation related to walls of an audio room. Thereafter, the DUT 106 is moved from audio room to audio room 110 to 118 where each room tests a different audio setting such as a far field range, and so forth. The output audio signals generated by the DUT in each room can then be used to generate desired reports such as an audio components evaluation (ACE) report which indicates the accuracy of algorithms that estimate acoustic parameters under certain reverberation conditions, a voice communication certification (VCC) report which indicates the quality of human voice communication executed via voice over internet protocol (VOIP) applications which can be popular online video conferencing applications, and a speech recognition certification (SRC) report which indicates whether the DUT and its configuration obtain certification for certain speech recognition applications, such as specific personal assistants which may include "Alexa", "Cortana", or "Siri", for example. The software stack 108 then may be adjusted to improve the audio quality. When needed usually due to large errors, the DUT 106 is physically shipped to other parties such as developers at separate audio sites S that assist with adjusting the software stack or other characteristics of the configuration #1 104, or to other parties with remote sites 128. These other sites 126 or 128 may have their own audio room testing setup the same or similar to that as the first audio site 1 102, where the DUT must be moved from audio room to audio room to test the DUT in different audio environments.

The conventional testing may be accomplished by using standard procedures for speech quality evaluation that includes long speech tests with many samples in a presence of background noise within the dedicated audio rooms. The certification tests can last several hours for a single DUT in just one language. Thus, each speech quality recognition evaluation requires a large amount of time because hundreds of sentences need to be played back in the dedicated audio rooms. The certification also is a complex procedure that is costly to set up since it needs the multiple rooms and it is usually impossible to increase the speed of testing a single device since the same device must be placed in the multiple rooms. Different units of the same type of device cannot be used instead because even small differences due to manufacturing tolerances can provide erroneous results from room-to-room. Additionally, in the case of prototype units of a same device where each subsequent prototype fixes the problems of the previous prototype of the device, oftentimes intentional inconsistencies exist between these units, which can cause a great deal of confusion in debugging processes across different sites testing the devices.

The certification testing also usually requires that the audio be captured by the device from various distances and angles to conduct a reliable evaluation of a speech recognition performance. Thus, while the various rooms provide the acoustic effect of various echo path distances, the distance and angle between source and microphones still needs to be varied within each room. Thus, performing speech quality evaluation in various noise conditions and scenarios require a long duration, a large amount of manual work, and multiple physical audio rooms as well as a large amount of expensive hardware in order to emit desired audio such as particular background noise.

Current best practice in device development is to perform continuous audio quality testing throughout the entire development process to better ensure good quality of a product and maximize a likelihood of passing the required certifications. This usually involves physically shipping the same model or same physical unit DUT among multiple parties such as an OEM that internally tests the DUT as well as sites of separate developers of the hardware, drivers, firmware, and/or audio processing application or protocol components. For example, the OEM may find significant errors, and then ships the DUT to other appropriate developers so that those developers may be able to test and find the cause of the error. Thus, a physical presence of the same model and in some cases the single DUT is needed at multiple different physical sites. The shipping among the parties can cause several problems such as unnecessary significant delays required for logistics related to the shipment, and an unnecessary risk of leaks regarding technology, form factor, or other trade secrets. Thus, such shipments also can be practically impossible when an OEM refuses to ship a new hardware configuration off of its site for security reasons, or for some reason, the hardware configuration cannot be physically maintained to be shipped off site. Typically, the single DUT also is moved back and forth between multiple audio rooms and software integration teams in a continuous loop until a device development lifecycle is finished. Sometimes all quality gaps are addressed on time, but it is more often than not that poor quality will exist due to insufficient time to fix most or all problems.

These factors contribute to a suboptimal situation where either development costs are increased by allocating precious audio lab time early in the development process, or additional costs are avoided by delaying the testing to perform much higher risk last minute validation and potentially compromise quality, which happens often. Specifically, in order to avoid severe flaws in the audio operation of the DUT, product quality should be verified early in the development process in a manner that is as close to a real life scenarios as possible. When the testing is performed in advanced development stages, it is often too late to implement any fundamental changes.

To resolve these issues, a method and system of generating a virtual audio device data package is disclosed. The package includes audio data that is particular to a specific DUT, and therefore adequately specific to a certain type of device, such as a certain laptop model or smart phone model. This is accomplished by gathering certain measurements from an anechoic chamber that can permit differentiation of impulse responses of the device from impulse responses of the room and other test setup parameters, for example. Then, the resulting acoustic characteristics of the device can be stored in the form of a virtual acoustic representation of the device, hereinafter referred to as a virtual audio device data package of a virtual acoustic or audio device. The data package does not represent a specific acoustic environment or audio room setup. Instead, predetermined audio room representation data that represents various audio room setups can be applied by a simulation tool to the virtual audio device data package to generate simulated audio data output as if the audio device was placed in one or more audio rooms each with a particular acoustic setup without actually placing the physical audio device in the actual physical audio rooms. Thus, the virtual device representation can be coupled with previously measured or simulated room acoustics and audio hardware to perform high precision simulation of device acoustic performance in a target acoustic environment, and to evaluate the device audio quality in the simulated audio room. Specifically, the simulated audio data output can then be used to run performance tests for audio applications such as ASR, WoV, and/or other audio quality testing applications, for example. This allows for simulation of multiple certification setups just after single short measurement sessions in an anechoic chamber. It will be appreciated that herein, the terms acoustic and audio are used interchangeably.

This arrangement is a fast and effective method to test performance of audio devices that provides good scalability since more use cases can be simulated offline and in parallel versus the delay and limited access of conventional testing setups using actual labs with multiple real audio rooms. Also, the present system improves audio quality because the disclosed method and system enable earlier and broader testing protocols by avoiding the physical shipping and audio room limitations so that the present method and system obtain better final quality audio for the audio devices. By one example, shift-left acoustic certification processes, related to testing early in software-stack development lifecycles processes, are made easier since acoustic performance of an audio device is more related to hardware and more invariant to software so that the disclosed simulation and offline evaluation of the present methods can be repeated continuously during software-stack development lifecycles instead of being limited to a relatively small number of measurements only after a software release. This can aid with detecting potential issues in earlier stages of product development.

From the perspective of audio application development, the present method can be used to evaluate and control stability of audio protocols (including software, firmware, and/or hardware arrangements) on various devices in various conditions. Since the audio testing methods herein are highly parametrized, using the present methods allows for easily increasing the number of test-cases as desired without wasting time to obtain and analyze audio recordings in audio labs, thereby better achieving end user experience goals.

Also, since the virtual audio device data package of a single instance from the present method and system is generated from a single audio device tested only in an anechoic chamber, this provides a stable and coherent device acoustic representation providing a single source of acoustic data for various stages of debugging. In other words, the virtual audio device data package eliminates other potential external causes for differences in results from test to test such as those differences caused by differences in device assembly, varying acoustic conditions in audio labs, or hardware degradation. Otherwise, the present methods permit the virtual device to be evaluated simultaneously in multiple remote locations without the need for physical shipment of hardware to locations around the globe between developer sites, OEM sites, and/or other remote sites, thereby streamlining cooperation among the parties. The result is cost savings since the method and system disclosed herein permit multiple product development teams to steadily reproduce different acoustic tests result without having multiple units of the device or having multiple audio labs.

Figure 2:
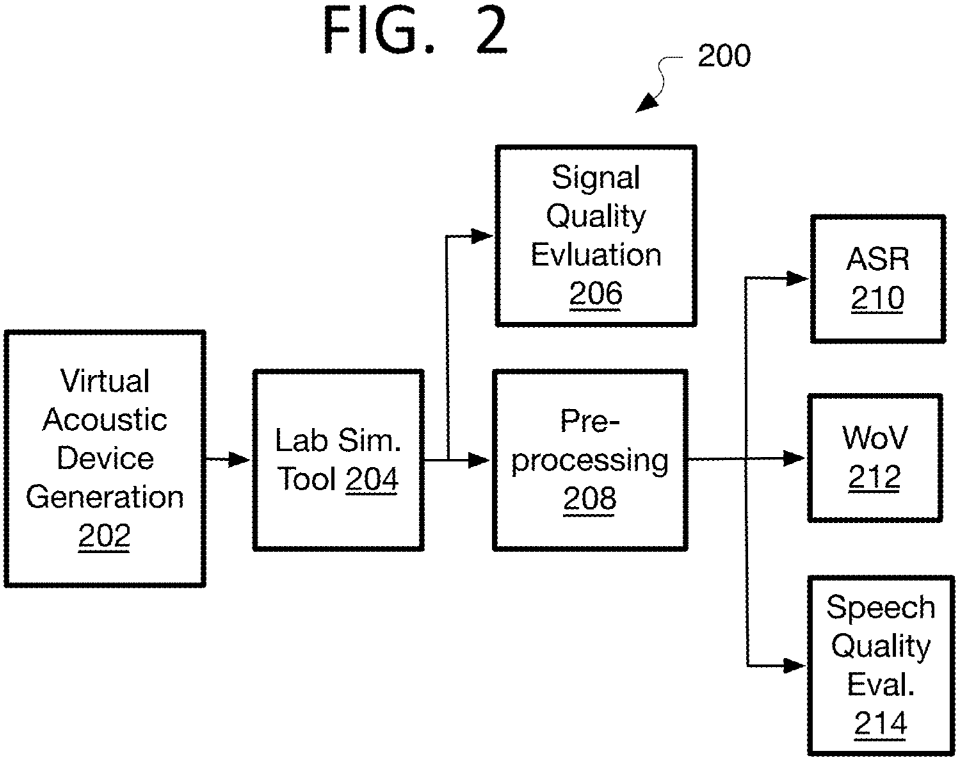
FIG. 2 is a schematic diagram of an audio device testing system according to at least one of the implementations herein.

Referring to FIG. 2, an example audio device testing system 200 has a virtual acoustic device generation unit 202 that generates and provides virtual audio device data packages to a simulation tool (ST) or unit 204. The ST 204 generates simulated output audio data for an audio device and related to various audio environments as if the audio device was tested in those audio environments. As described herein, the audio environments can include audio rooms with various sizes, acoustic materials, speaker arrangements, and/or audio source arrangements relative to the audio device, and so forth as described below. The simulated output audio data then may be provided to a signal quality evaluation unit 206 to test the quality of the simulated output audio data as well as to a pre-processing unit 208 that refines the output audio data for use to test the simulated output audio data, and in turn certify the audio device, when desired, for specific audio applications such as with an ASR unit 210, a WoV unit 212, and other speech quality evaluation units 214. The details are provided below.

Figure 3:
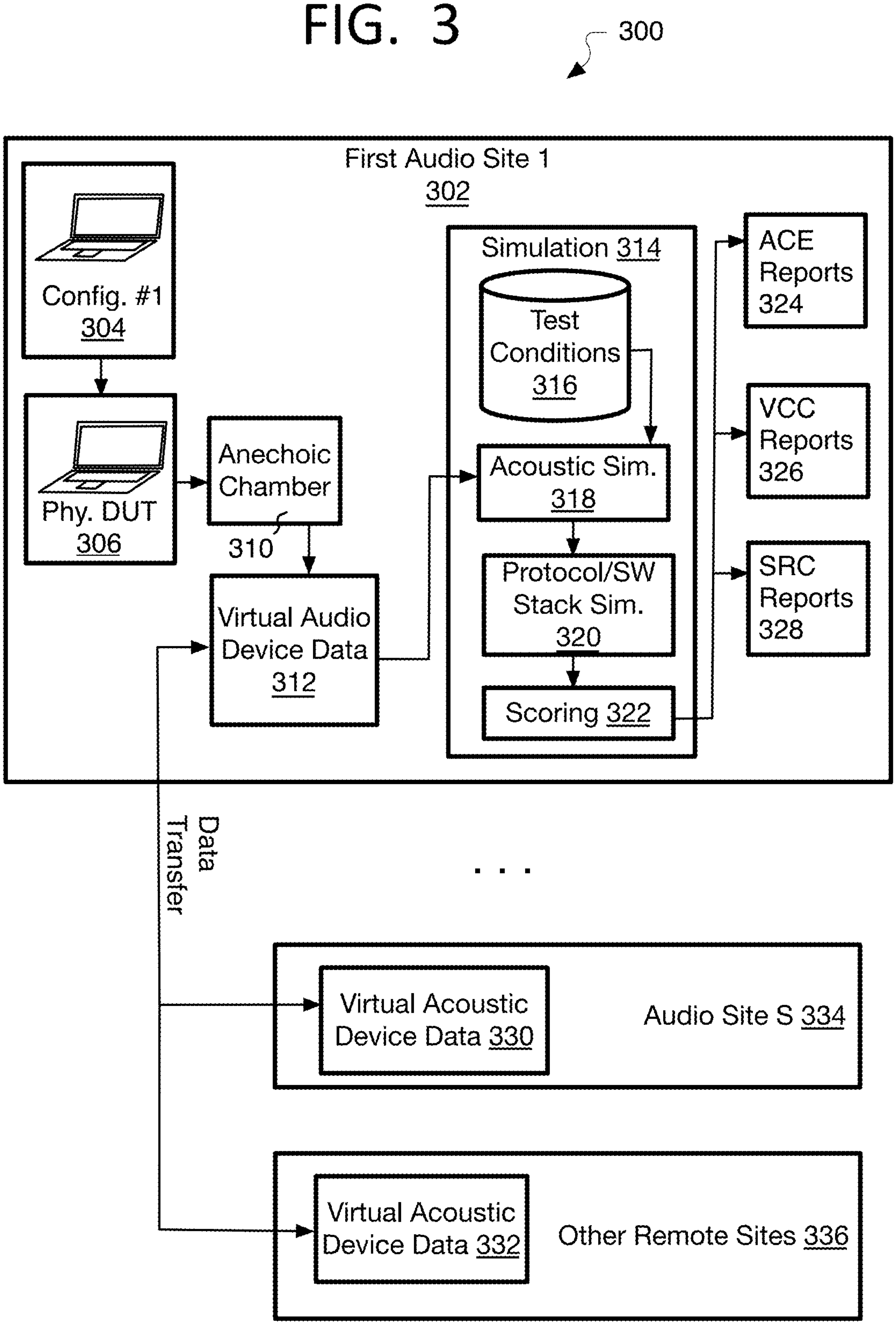
FIG. 3 is a detailed schematic diagram of an audio device testing system according to at least one of the implementations herein.

Referring to FIG. 3, an example audio device performance testing system 300 provides other details of the method and system disclosed herein to capture acoustical characteristics of an audio device, and store and transmit the acoustical characteristics in a form of a redistributable package which can be shared between interested parties. The system 300 has a first audio site 1 302, which may be an OEM physical site (whether a room, building, plant, campus, and so forth). An audio device configuration #1 304 here may include a specific physical configuration of an audio device such as a laptop chassis with speakers and microphones at certain positions and orientations relative to each other and the physical shape of the chassis. The configuration #1 304 here also may include the hardware, firmware, and/or software that operates the audio device. The configuration 304 is provided on a physical audio device under test (DUT) 306.

The DUT 306 is placed in an anechoic chamber 310 to perform open-loop testing where open-loop refers to over the air when audio will be emitted from one or more speakers, and the audio device may be placed at a variety of positions and orientations in the anechoic chamber so that the audio device's microphones pick up the emitted audio and create audio signals. The captured audio signals are then used by a virtual audio device data unit 312 to generate a virtual audio device data package that represents the captured acoustical characteristics of the audio device 306. As mentioned, the package also may be referred to as the virtual audio or acoustic device itself. A virtual audio device data package may be generated for each different configuration used and whether varied by physical features on the audio device whether the chassis or other parts of the audio device such as those parts forming an opening to microphones for example. Otherwise, the hardware, firmware, and/or software, whether or not audio related, or more general such as the operating system (OS), may be varied from package to package.

The packages are then provided to a simulation unit (or tool or circuit) 314 to generate simulated audio output as if the audio device was tested in an audio room with certain acoustic characteristics. The simulation tool 314 may provide a virtual audio device data package for each different audio room or different set of acoustic characteristics being supported. By one form, this may depend on the testing requirements for a specific application certification.

The simulation unit 314 may have a test conditions database 316 that holds the data characterizing one or more audio rooms (or acoustic characteristic sets) that each represent a different acoustic environment that is different in at least one way as described below. An acoustic simulation unit 318 uses the virtual audio device data package and the audio room data to generate the audio output that simulates the output from the particular audio rooms or acoustic characteristic set environments. The virtual data output is then used as input audio signals by a protocol and/or software stack simulation unit 320 to run the audio applications that will use the audio, such as ASR and WoV to recognize the speech, and so forth. It should be noted that the simulations may be performed to replace or extend current procedures with reliable simulations of device behavior in certification setups as well as any other real-world end-user scenarios that might be used. Thus, the simulations may include use of both complete hardware and software stack arrangements. A scoring unit 322 then scores the quality (or accuracy) of the recognition. The scores then may be provided in the ACE reports 324, VCC reports 326, and/or SRC reports 328, to name a few examples.

When the accuracy of the audio results at the first audio site 1 302 is insufficient, the virtual audio device data package may be transferred as a data transfer to other remote locations or sites 334, such as sites of other developers of the physical form of the device, software, firmware, or hardware, or to any other remote parties 336. The packages may transferred over any communications or computer network that handles data transfers, and whether a local area network (LAN) or wide area network (WAN) such as the internet. Thus, the physical location of the developers and other parties receiving the packages around the world is not limiting in any way when such networks are available. The developers or other parties can then accurately and efficiently run their own tests with their own copy of the virtual audio device data packages 330 or 332 without the need of actually receiving the real physical audio device being tested (the DUT). Since the packages are being used and manipulated instead of the physical audio device itself, this may provide time for a larger number of tests that would not otherwise be performed. This substantially increases the efficiency and accuracy of the product development and testing approval processes.

Figure 4:
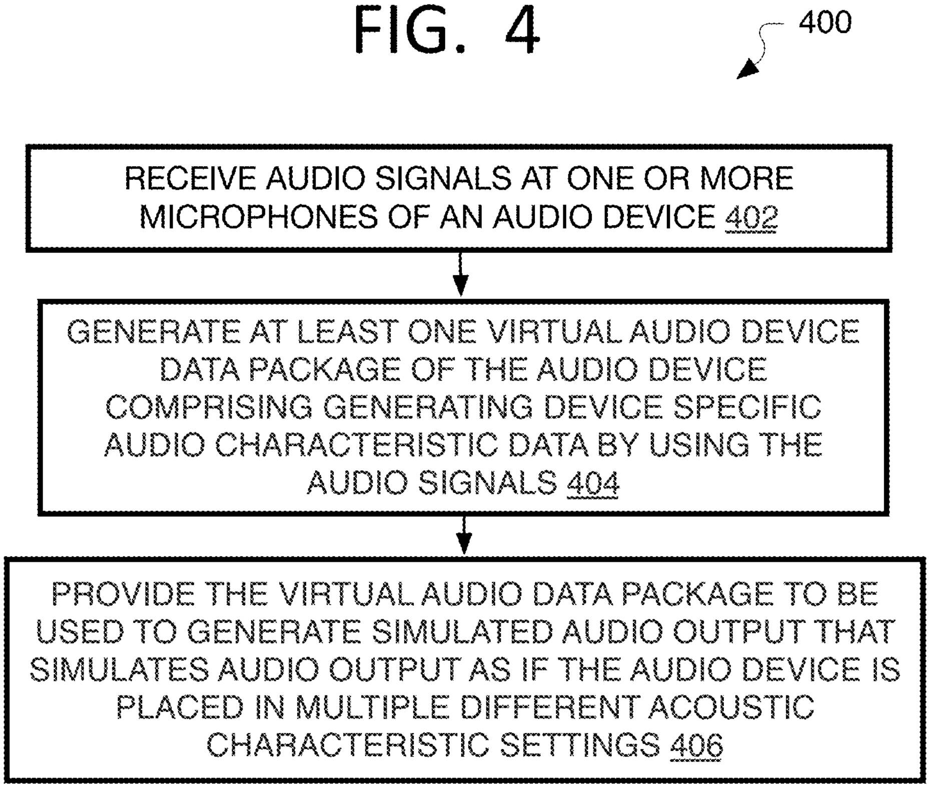
FIG. 4 is flow chart of a method of forming a virtual audio device data package according to at least one of the implementations herein.

Referring to FIG. 4, a process 400 is provided for forming a virtual audio device package in accordance with at least some implementations of the present disclosure. In the illustrated implementation, process 400 may include one or more operations, functions, or actions as illustrated by one or more of operations 402 to 406 numbered evenly. By way of non-limiting example, process 400 may be described herein with reference to operations discussed with respect to any of the systems or circuits described herein.

Process 400 may include "receive audio signals at one or more microphones of an audio device" 402. The audio may be emitted by speakers on the audio device for part of the test and from external speakers on another part of the test as described below. By one form, a test audio sequence may include various parts for various purposes such as silence, a pure tone, a sine sweep, and a maximum length sequence (MLS). In some forms, silence may not be a part of the audio signal and may be captured by the audio device recording when no audio is being emitted.

Process 400 may include "generate at least one virtual audio device data package of the audio device comprising generating device specific audio characteristic data by using the audio signals" 404, and as described herein, to generate (1) self-noise data related to self-noise of the audio device, (2) impulse response data related to linear echo or capture impulse responses determined by emitting audio from one or more speakers of the audio device and received by one or more microphones on the audio device, (3) non-linear distortion impulse responses of audio emitted from one or more speakers on the audio device and captured at the audio device, and (4) loopback data obtained by generating impulse responses of stored data of an audio signal rather than data of the audio signal as obtained over the air through microphones. The package also may have, or be associated with, directional or estimated impulse response data obtained by directing audio from at least one external speaker at multiple different angles relative to one or more microphones on the audio device. The directional impulse responses may be used to determine directional sensitivity values and/or geometric microphone location values as part of the package. The package also may have or be associated with clock drift parameters. All of these device specific audio characteristic data types are described in detail below.

Process 400 may include "provide the virtual audio device data package to be used to generate simulated audio output that simulates audio output as if the audio device is placed in multiple different acoustic characteristic settings" 406. Specifically, a simulation tool (or unit or circuit) can be used to generate simulated output that is audio signals obtained as if the audio device was placed in an audio room or a specific acoustic characteristic setting. The simulation tool may use all or some combination of the device specific audio characteristic data to generate the simulated output.

Figure 5:
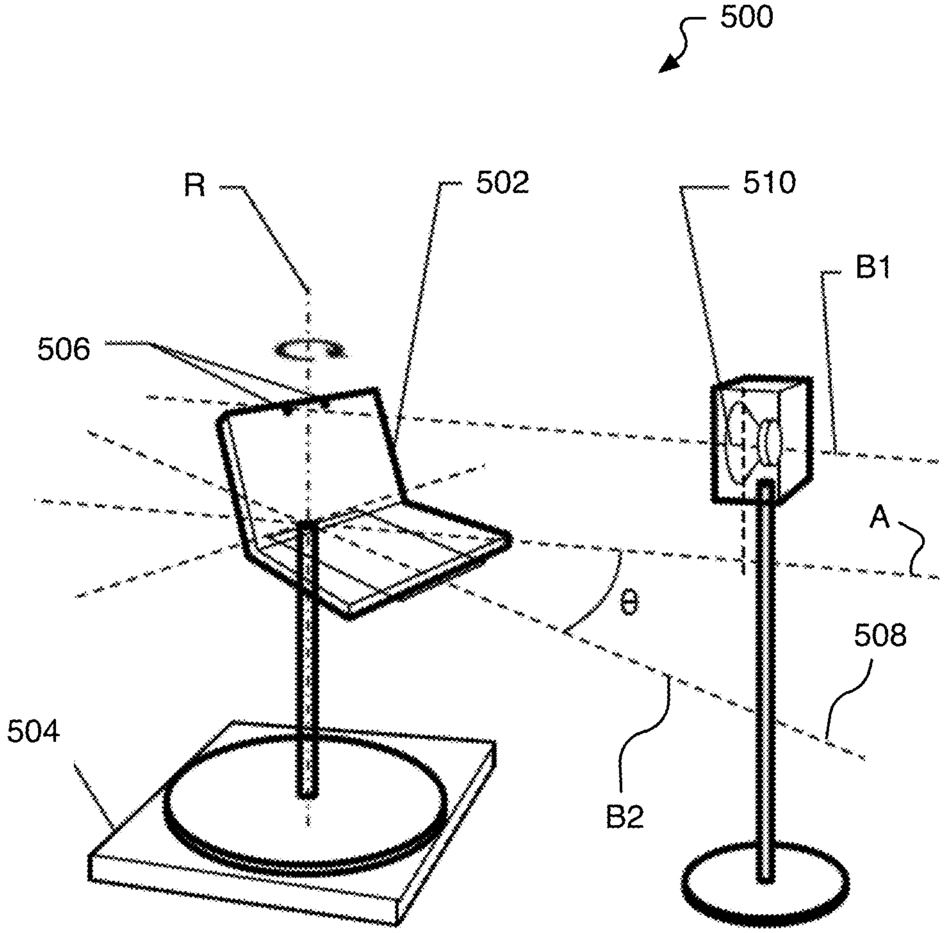
FIG. 5 is a perspective view of an audio measurement setup according to at least one of the implementations herein.

Referring to FIG. 5, an omnidirectional audio evaluation setup 500 may be used to collect data for creating the virtual audio device and performing an efficient and automated measurement procedure. The setup 500 is arranged to collect audio signal data for the variety of audio data types being collected to form the virtual audio device data package. Thus, for example, the setup 500 may be used to measure directional sensitivity. Thus, as shown, a DUT 502 with microphones 506 is mounted on a rotary fixture 504 that is arranged to rotate the DUT about a rotation axis R, for example, over a 360 degree angular sweep of azimuth, or any portion thereof. One or more external speakers 510 is shown to be positioned at a zero degree axis or reference direction A. For the directional sensitivity measurement process, the DUT 502 may be rotated to a desired number of different measurement axes 508 (B2), at azimuth angles θ relative to the zero degree axis A. An axis B2 can be determined to control the vertical angle from the speakers 510 to the microphones 506 as well. In some implementations, θ may be incremented horizontally by about five degrees for each measurement to generate directional IRs as discussed below.

Figure 6:
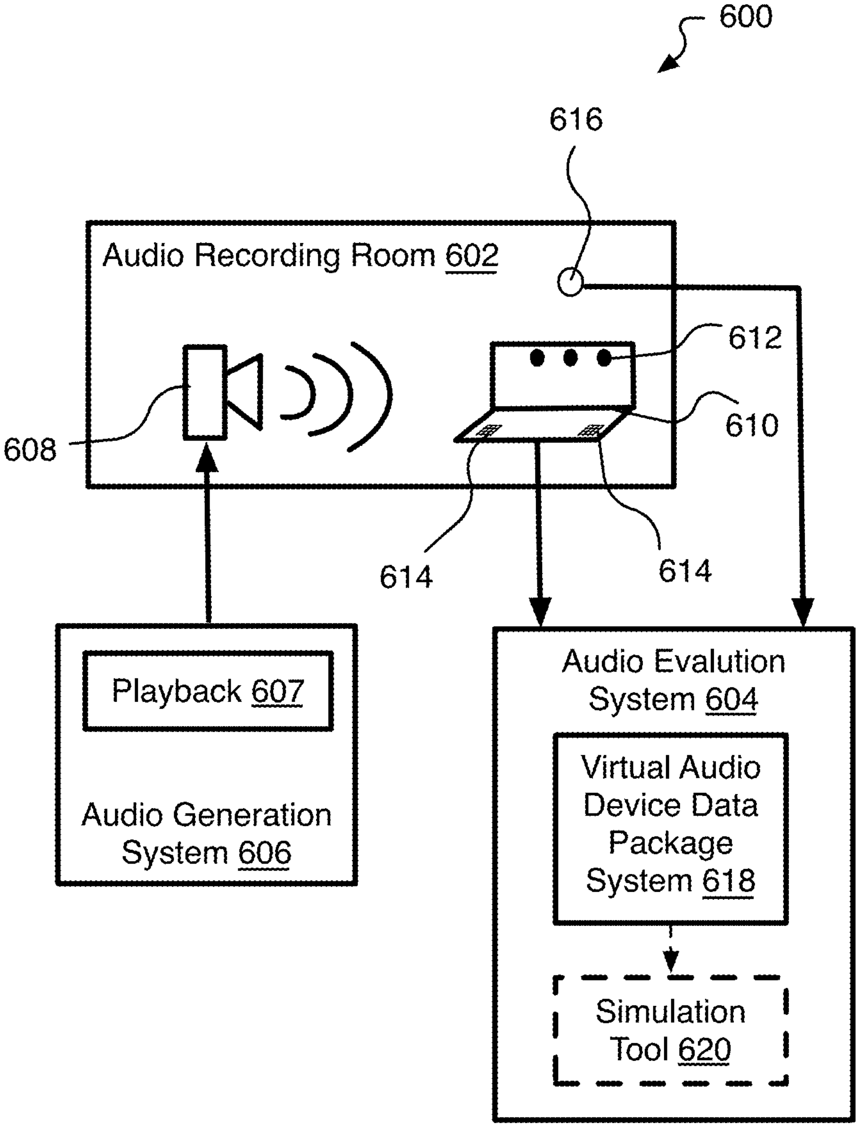
FIG. 6 is a schematic diagram of an audio device performance testing system according to at least one of the implementations herein.

Referring to FIG. 6 for more details, a system 600 for open-loop multichannel audio capture evaluation is arranged in accordance with at least one implementation of the present disclosure. The system 600 is shown to include at least one audio recording room 602 that may be an anechoic chamber, an audio generation system 606 that may include, or be in communication with, a playback unit or circuit 607, at least one speaker 608 to emit audio provided by the playback unit 607, a DUT 610 with at least one integrated microphone 612, and at least one internal speaker 614, a reference microphone 616, and an audio evaluation system 604. The reference microphone 616 is placed near the microphones of the DUT and is used to generate estimated impulse responses for multiple audio signal angles as mentioned below. The audio evaluation system 604 may have a virtual audio device data package system 618 that generates the packages and a simulation tool or circuit (or unit) 620 may be provided to use the packages and generate simulated output as described herein. In some implementations, the speaker 608, reference microphone 612, and DUT 612 may be located in an audio recording room 602, or other suitable environment, that is, or acts as, an anechoic chamber that is relatively free of noise and configured to reduce or eliminate reverberation and other undesired audio effects.

The audio generation system 606 is arranged to generate a digital test audio signal to be provided to the playback unit 607 which may generate a test audio signal for broadcast through speaker 608. The audio generation system 606 may generate test sequences, which may be in digital form. In some implementations, the digital test sequence may be a chirp signal or a maximum length sequence (MLS). By one example, the digital test sequence may be about 30 seconds in length.

The audio generation system 606 also may provide the digital test sequence with a synchronization header and a control signal to generate the digital test audio signal. In some implementations, the synchronization header may be an exponential chirp signal about one second in length or other known short-time signal that is relatively easy to detect using cross correlation methods. In some implementations, the control signal may be a tone of known frequency, for example a 32 second 1 kHz tone, that serves as a clock compensation control signal. The resulting digital test audio signal is provided to the playback unit 607, which is configured to convert that signal to an analog test audio signal for broadcast through speaker 608.

The audio sequence emitted from the DUT's speakers 614 may have similar characteristics, but may emit a silence part to record DUT self-noise and a sine sweep part to be used to generate linear echo (or capture) impulse responses or non-linear distortion impulse responses.

The DUT microphones 612 and reference microphones 616 captures the broadcast test audio signal. The DUT microphones 612 may capture the broadcast test audio signal as a multi-channel DUT audio signal with N channels, for example.

The audio capture evaluation system 604 is arranged to analyze the captured audio signals, evaluate the audio capture path of the DUT microphones 612, and at least provide the virtual audio device data packages representing virtual audio devices, as described below. Whether locally or remotely, the simulation tool 620 then may be used to generate simulated output that can be used to evaluate audio application performance as described above with systems 200 and 300. The simulation tool 620 may be considered part of the audio evaluation system 604 regardless of the physical location of the circuitry including the hardware, firmware, and software forming the simulation tool 620 so that the simulation tool may be local or may be located at remote sites as described with arrangement 300 (FIG. 3).

Figure 7A:
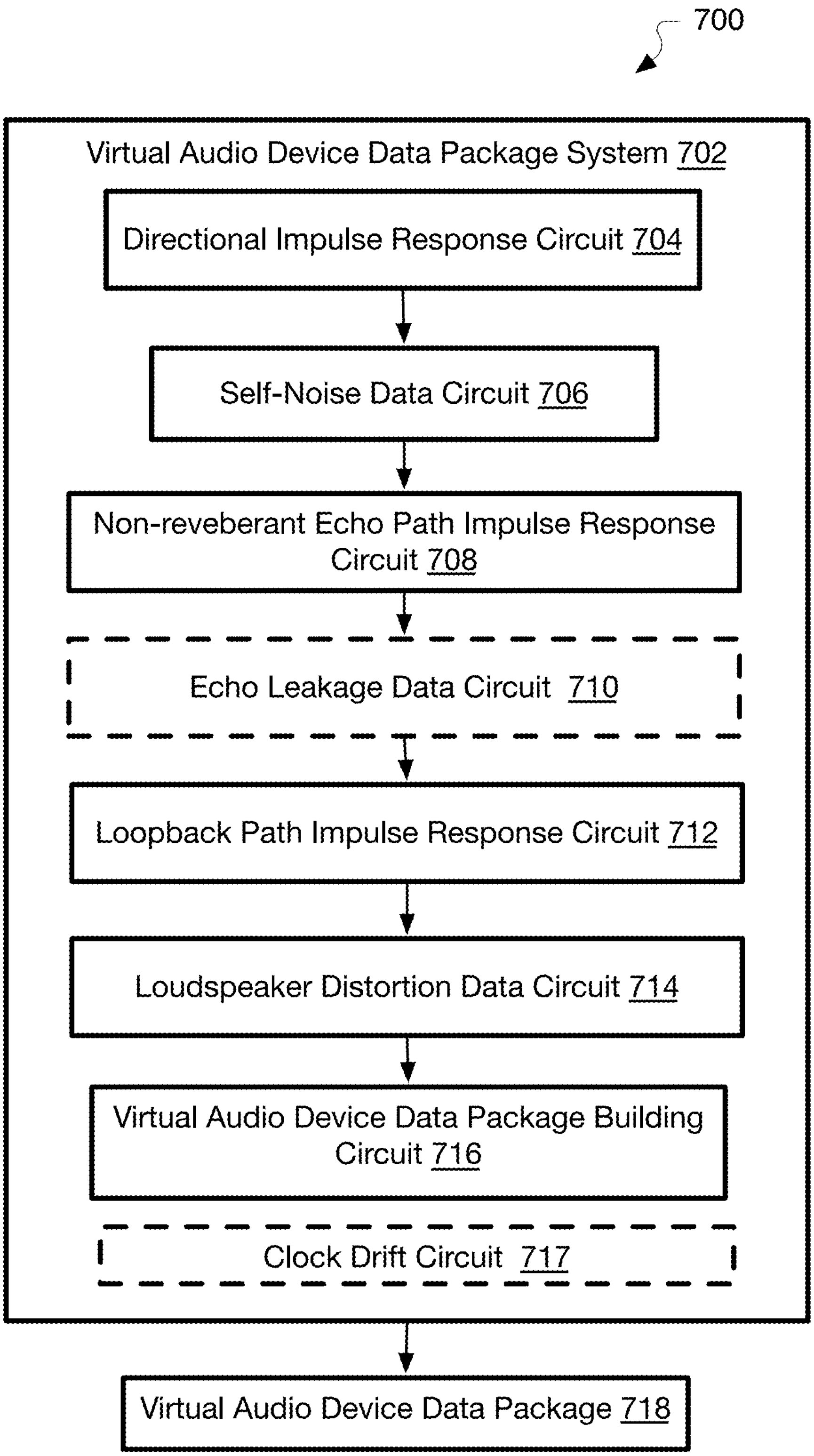
FIG. 7A is a schematic diagram of a virtual device data package system according to at least one of the implementations herein.

Referring to FIG. 7A, an example virtual audio device data package system 700 is arranged according to at least one of the implementations herein to generate the virtual audio device data packages 718, which may be similar to the package 1600 (FIG. 16) described below. By one form, a virtual DUT is represented by the virtual audio device data package and that has data of several metrics derived from a specific test sequence recording, where each part of the sequence may be used to test different characteristics of the audio device as well as silence being recorded before or after the sequence is played, or in designated sections of the sequence itself. Thus, other than the silence, the sequence provides a pure tone part, a maximum length sequence (MLS) part, and a sine sweep part. See, Rife. Douglas D., et al., "Transfer-function measurement with maximum-length sequences." Journal of the Audio Engineering Society, 37.6, 419-444 (1989); and Farina, Angelo, "Simultaneous measurement of impulse response and distortion with a swept-sine technique", Audio Engineering Society Convention 108. Audio Engineering Society (2000). These sections of the audio test sequences may be used to compare audio signals as provided by the microphones to target quality thresholds during post-processing of the recordings to generate impulse responses. The results are the impulse responses of the microphones to be placed into the virtual audio device data packages.

To accomplish this, the system 700 may have a directional impulse response circuit 704, a self-noise data circuit 706, a non-reverberant echo path (or linear path) impulse response circuit 708, an optional echo leakage data circuit 710, a loopback path impulse response circuit, a loudspeaker distortion (or non-linear path) data circuit 714, and a virtual audio device data package building circuit 716. An optional clock drift circuit 717 also may or may not be part of the package system 700.

The directional impulse response circuit 704 performs an open-loop multichannel omnidirectional impulse response (IR) technique to at least generate IR estimates of the microphones 612, but also may provide measurement of directional sensitivity of the microphones 612 and validation of the geometric layout of the microphones 612 on the DUT 610. The estimation of the IRs of the microphones 612 may account for many different effects arising from the integration of the microphones in the DUT 612 to avoid undesired variations caused by the physical DUT and the physical components of the DUT itself. The details of this process are disclosed by U.S. patent application Ser. No. 16/886,225, filed May 28, 2020, and published as U.S. Patent Publication No.: 2020/0359146, published on Nov. 12, 2020 with the title "Open-loop multichannel impulse response measurement and capture path evaluation", which is incorporated herein for all purposes.

Figure 7B:
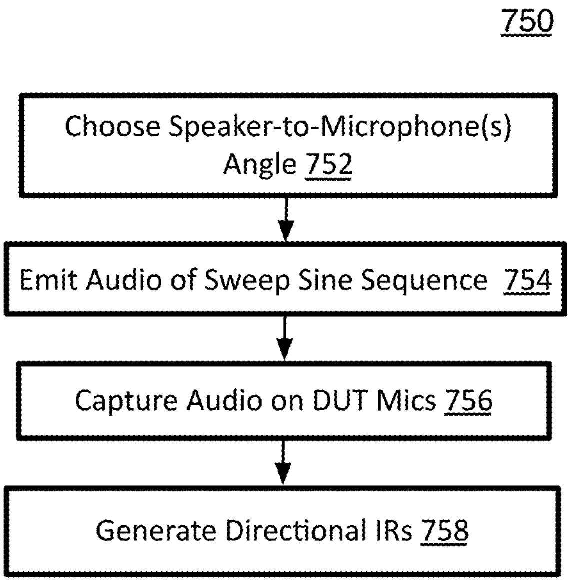
FIG. 7B is a flow chart of a method of generating directional estimate impulse responses in accordance with at least one of the implementations herein.

Referring to FIG. 7B and relevant here, the directional IR circuit 704 may operate an example process 750 to generate the directional IRs. Thus, process 750 may include "choose speaker-to-microphone(s) angle" 752, where the process is repeated for multiple angles between a reference direction A and a measurement axis 508 as shown on setup 500 (FIG. 5) that can be used here. This is referred to as the incidence or measurement angle. The process 750 may be repeated for each 5 degree increment in the horizontal around 360 degrees by one example.

Process 750 then may include "emit audio of sweep sine sequence" 754, and emitted from the external speakers rather than on the audio device speakers. Other sequences can be used as well.

Process 750 then may include "capture audio on DUT device" 756, where the DUT microphones receive the emitted audio and generate corresponding audio signals that can be saved and analyzed. Thereafter, process 750 may include "generate directional IRs" 758 or estimate IRs of the DUT microphones based on a comparison of a test audio signal received through the DUT microphones, at the given measurement angle to the test audio signal received through the reference microphone. This is repeated for each measurement angle being analyzed. Other details are provided the 2020/0359146 publication as mentioned above.

The system also may include calculating group delays for the DUT microphones based on phase responses of the estimated impulse responses. The group delays provide a measure of the time delay of the sinusoidal frequency components of a signal through each of the microphones. The circuit further may include calculating a distance between each DUT microphone and a geometric center of the array of DUT microphones. In some such implementations, the distance is calculated as a product of the speed of sound and a difference between the group delays for each of the DUT microphones and an average of the group delays. The process may be repeated for additional angles of incidence and the distances for each angle may be combined, for each microphone, to generate cartesian coordinates for the microphones. These generated coordinates then may be compared to expected values (e.g., provided by the manufacturing specifications) to validate the DUT. In some implementations, directional sensitivity of the microphones may be determined over the range of measurement angles by using the estimated IRs to test for beamforming.

The measurements enable computation of both magnitude and phase frequency responses across the device's microphones, including phase differences between microphones, across many possible angles of sound incidence in a horizontal plane. The evaluation includes estimation of the impulse responses of the microphones, measurement of directional sensitivity of the microphones, and validation of the geometric layout of the microphones on the DUT. The geometric layout of the microphones refers to the location of the microphones within the device and relative to one another. Validation of the geometric layout of the microphone array is particularly useful to evaluate the functionality of beamforming applications which depend on time delay (or equivalently phase shift) between the microphones, which in turn depends on the relative spacing or geometric layout of the microphones.

By one example form then, at least the directional IRs are placed in the virtual audio device data package. In another form, direction sensitivity values as well as microphone geometry coordinates computed by using the directional IRs also are placed in the package. The directional IRs and the other data are in the form of an attribute-value pair, such as JavaScript Object Notation (JSON) for example.

Figure 8:
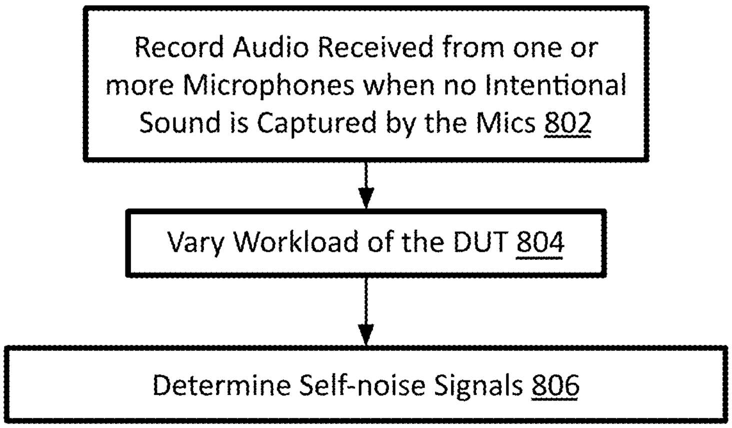
FIG. 8 is a flow chart of a method of generating self-noise related data in accordance with at least one of the implementations herein.

Referring to FIG. 8, self-noise data circuit 706 may perform a process 800 to factor self-noise of the DUT in the virtual audio device data package according to at least one of the implementations herein. In the illustrated implementation, process 800 may include one or more operations, functions, or actions as illustrated by one or more of operations 802 to 806 numbered evenly. By way of non-limiting example, process 800 may be described herein with reference to operations discussed with respect to any of the systems or circuits discussed herein.

It has been found that one factor contributing to the audio device's performance is its self-noise, which usually originates from cooling fans on the audio device but also from electrical components such as ringing and buzzing capacitors, power supplies, analog/digital converters, and other circuitry. Noise also can be due to chassis vibration, microphone diaphragm inertia, and processing indicators (beeps and other noises) audibly emitted from the audio device. Self-noise, and most particularly fan noise, can vary throughout operation of the device depending on the workload so that the testing may involve capturing multiple signal samples both on the audio device's internal microphones and at least one external level-calibrated measurement microphone, which here may be the reference microphone, at a known distance.

Process 800 may include "record audio received at one or more microphones when no intentional sound is captured by the mics" 802. By one form, this involves obtaining the self-noise data directly from at least one silent section of the recording. According to known timestamps, it is precisely cut out of the entire recording and serves as a base, e.g., for looping audio. In this case, the silence may be a silent section within an audio sequence that is played. By one alternative form, the silence is recorded before or after an audio sequence with sound is played.

Process 800 may include "vary the workload of the DUT" 804 such that the recording of silence may be performed a number of times each with a different level of workload on the audio device, whether performing audio tasks or other non-audio related tasks, since varying the workload of the audio device can result in different types and/or volume levels of the self-noise. The mean or some other combination of the silence signals then may be used to form self-noise signals.

Process 800 may include "determine self-noise signals" 806, where the noise may be extracted from the captured audio by cutting precise fragments with known timestamps that should be silent except for the audio device's own sounds. When multiple self-noise samples are captured, the resulting DUT self-noise signal may be the worst performing (highest value) self-noise or an average of all captured samples. The resulting self-noise signal data to be placed into the virtual audio device data package may be in the form of a wav file for audio data and a JSON file for numeric data.

Figure 9:
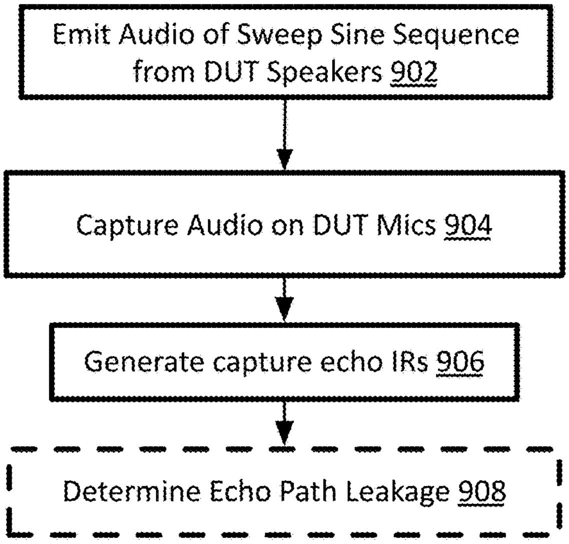
FIG. 9 is a flow chart for measuring impulse response of non-reverberant components of an audio device's echo path coupling and measuring echo leakages according to at least one of the implementations herein.

Referring to FIG. 9, the non-reverberant echo path impulse response circuit 708 performs process 900 to obtain capture echo impulse responses of the audio devices echo's paths from the audio device's internal speakers to its own microphones according to at least one of the implementations herein. In the illustrated implementation, process 900 may include one or more operations, functions, or actions as illustrated by one or more of operations 902 to 908 numbered evenly. By way of non-limiting example, process 900 may be described herein with reference to operations discussed with respect to any of the circuits or systems herein.

Specifically, another audio characteristic that may be factored in the packages is a simulation of speech captured during sound playback through internal speakers 614 (FIG. 6) of the audio device. Audio captured from the audio device's own speakers may be considered parasitic echos for analysis purposes herein since audio typically emitted from the audio device's speakers is usually meant to be listened to by a user and is undesirably picked up from the audio device's own microphones.

Simulation of such scenarios is complex because echo paths depend on both non-linear distortions of audio from the audio device's speakers and on the reverberation of a room that the audio device is within. A non-linear distortion occurs when new frequency components (harmonics) are generated in the audio signal. Non-linear distortion is an inherent phenomenon of the sound playback path and varies between devices, hence it cannot be generalized from device to device and should be measured. The particular audio signal processing and mechanisms of the speakers can cause such distortions. On the other hand, a linear distortion has changes in phase or amplitude without newly added frequencies. Reverberation simply refers to audio waves that reflect from surfaces such as within an audio room. In an anechoic chamber, ideally very little, if any, detectable reverberation exists.

Figure 10:
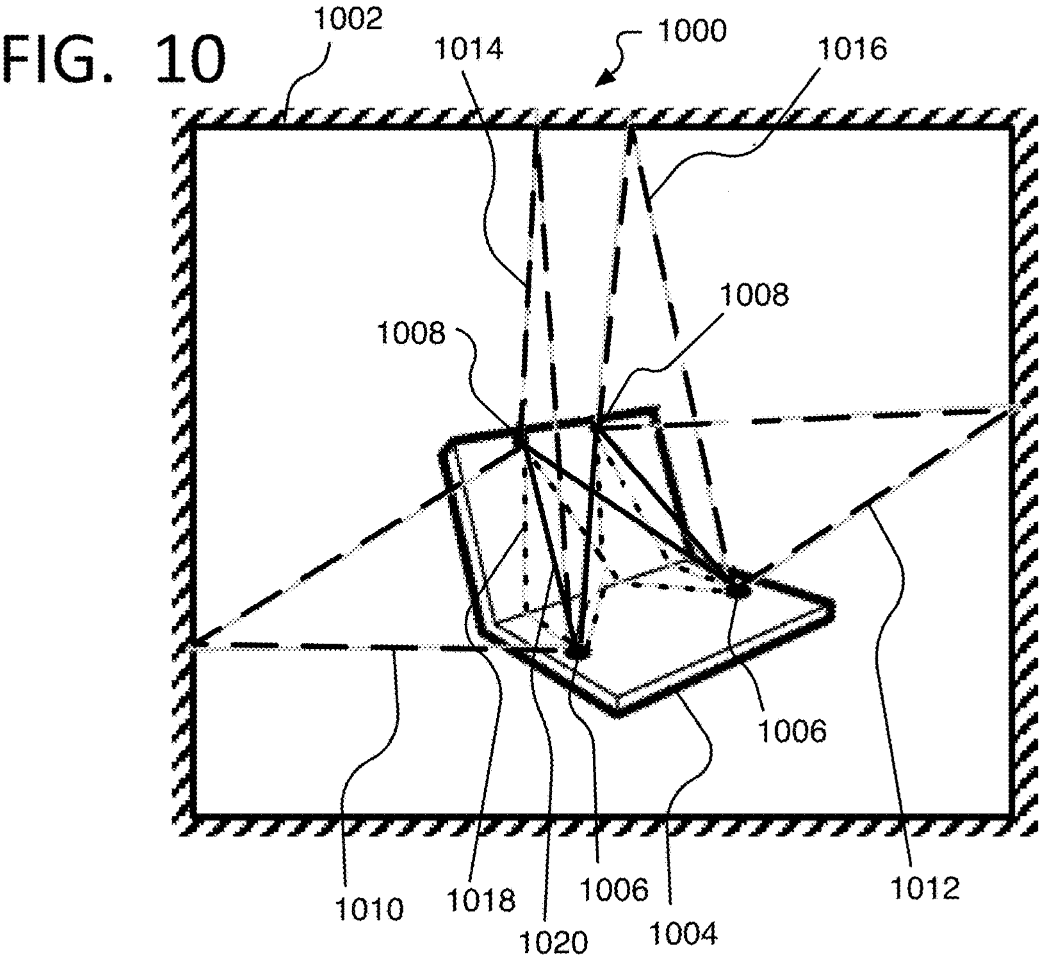
FIG. 10 is a perspective view of an audio device shown with echo paths.

Referring to FIG. 10, an audio recording setup 1000 for at least one of the implementations herein shows an audio device 1004 inside an anechoic chamber 1002 and with acoustic paths of audio emitted from the audio device's own speakers 1006. Solid lines 1020 show direct echo coupling from one of the speakers 1006 to microphones 1008. The small dashed lines 1018 show indirect echo coupling through the audio device's housing body. Since the audio device is within an anechoic chamber 1002, a very small amount of reverberation should be detected.

Thus, to perform the echo path analysis, process 900 may include "emit audio of sweep sine sequence from DUT speakers" 902. Thus, an audio sequence, such as the sweep sine sequence, may be played on the DUT speakers, although other types of audio sequences could be used such as pseudorandom noise such as a Maximum Length Sequence (MLS). For linear distortion testing, a safe, standardized sound pressure level (SPL or volume) may be used that would not induce significant non-linearities in the playback path and better ensure a high signal-to-noise ratio. Also as mentioned, this is performed in an anechoic chamber.

Process 900 then may include "capture audio on DUT microphones" 904, where the DUT microphones capture the audio sequence or stream (or audio signal(s)) emitted from the DUT speaker(s)). Typical pre-processing of the audio signal ort stream should be disabled to enforce raw capture, indifferent to all factors but the hardware and form factor.

Process 900 may include "generate capture echo IRs" 906, and here, this refers to generating the linear echo IRs (also referred to herein as capture echo IRs). Also, in order to simulate audio playback on the audio device in various audio rooms, both reverberation (room-related) and non-reverberation (unrelated to a room) echo path components should be considered. The non-reverberation component is measured as a direct impulse response between internal loudspeakers and microphones of the audio device for each possible transducer pair combination (each possible pair between a single speaker and single microphone on the audio device) shown as direct paths 1020 on audio device 1004. The reverberation component 1010 or 1018 may be based on an impulse response from the internal loudspeakers to the measurement microphones on the audio device. The reverberation components should be negligible since the audio signal is obtained in an anechoic chamber, and is therefore ignored. It is assumed the audio signal only has non-reverberation components. This may be performed for each or individual direct non-reverberation echo path component. Using this approach, it is possible to simulate variable echo paths.

To generate the non-reverberation capture echo IR, the capture echo IR may be computed from the pre-processed audio signal, which here provides a desired range of frequencies by using the sine sweep sequence for example. This may result in a time domain capture echo IR for each different arrangement of software, firmware, and/or hardware being tested. The IRs of the reverberation component are computed separately in the same way so that the result may be two echo IRs (non-reverberation and reverberation) for each audio emission with a detectable reverberation component exists. The non-linear distortion of the echo paths are explained below with the distortion circuit 714 and process 1200. Generally, "distortion" often refers to the non-linear distortion.

Process 900 may include "determine echo path leakage" 908, and this may be operated by circuit 710. Here, the system can calculate an amount of echo path leakage by using the recorded audio. By one form, echo leakage can be measured as a weighted terminal coupling loss (TCLw). See for example, "Introduction to TCLw and Echo Response", Microtronix Systems, LTD, https://www.microtronix.ca/products/digital-phones-test-systems/tclw-and-echo-response-.html (2019). TCLw is an average of the echo response taken over a range of frequencies. By one form, TCLw is a single number that indicates how well a communication device or a microphone/audio system attenuates its echo signal. The TCLw can be expressed in dB where a higher TCLw indicates more attenuation of the echo. The echo leakage data can be an optional part of the virtual audio device data package as well, and may be subsequently used for echo cancellation operations.

Figure 11:
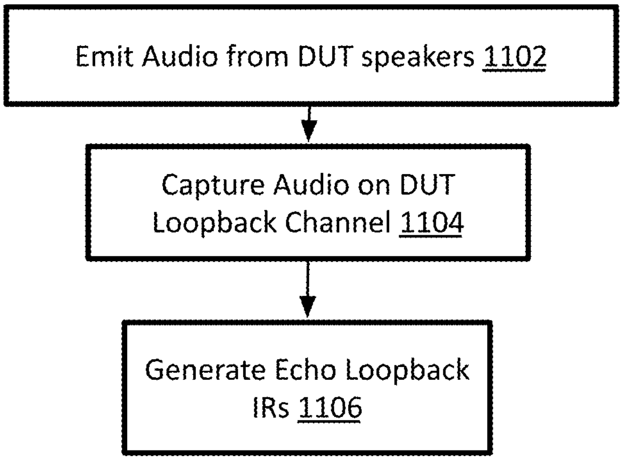
FIG. 11 is a graph showing fragmented and randomized test sequence stimuli for audio device loudspeaker evaluations according to at least one of the implementations herein.

Referring now to FIG. 11, a loopback path impulse response circuit 712 may operate a process 1100 to generate impulse responses for a loopback path of the audio device according to at least one of the implementations herein. In the illustrated implementation, process 1100 may include one or more operations, functions, or actions as illustrated by one or more of operations 1102 to 1106 numbered evenly. By way of non-limiting example, process 1100 may be described herein with reference to operations discussed with respect to any of the systems or circuits discussed herein.

Process 1100 may include "emit audio from DUT speakers" 1102. By one example, the audio signal is a sine sweep sequence, although other sequences can be used.

Process 1100 may include "capture audio on DUT loopback channel" 1104. Alongside the echo path impulse responses, the system may provide loopback path impulse responses. A loopback path often is a saved digital or stored data version of an audio signal that was or is to be emitted from a speaker and may be transmitted electronically over a loopback channel from the from emitter or playback circuit (or unit) to the audio analysis applications (or more particularly to a memory accessible by such applications). Thus, this is not analysis of an over-the air emitted audio signal obtained as acoustic waves at a microphone. The loopback path signal is saved separately from the actual sound waves emitted at a speaker. Thus, it is a copy of the audio signal that was or is to be emitted. The loopback signal may be obtained for loopback path analysis before, during, or after the audio signal is emitted by the speakers, as long as the system separately and electronically saves a copy of the audio signal or stream for emission. The emitted audio stream may be captured through the microphones on the audio device.

It may be desirable to have the system analyze the loopback path IR during audio device testing because some post-processing may be applied to the loopback path to obtain data to subsequently analyze the captured audio signal. The data may be used as a separate reference stream for subsequent acoustic echo cancellation and other reasons, for example. Thus, in one form, the simulated output can be used whether or not an audio testing system uses loopback path analysis.

Process 1100 then may include "generate echo loopback IRs" 1106, where the IR of the saved audio signal is computed rather than, or in addition to, any analysis of the captured audio signal captured through the microphones. This operation may include factoring post-processing filters. Specifically, the echo loopback IRs should represent potential filtering effects introduced by post-processing of the audio signal. This may include applying algorithms to the saved audio signal to clean and/or enhance the saved audio signal. Such post-processing may include psychoacoustically motivated loudness enhancement or speech clarity improvement, and other consumer-oriented sound processing.

Figure 12:
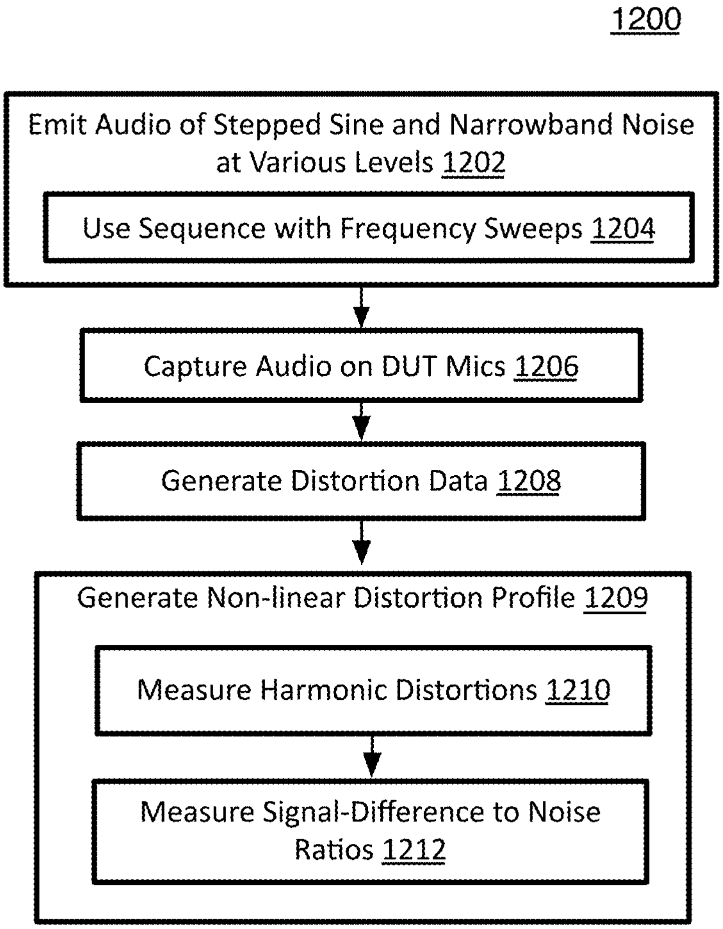
FIG. 12 is a flow chart for measuring impulse response of loopback paths according to at least one of the implementations herein.

Referring to FIG. 12, the loudspeaker distortion data circuit 714 may operate a process 1200 to generate non-linear distortion impulse responses according to at least one of the implementations herein. In the illustrated implementation, process 1200 may include one or more operations, functions, or actions as illustrated by one or more of operations 1202 to 1212 generally numbered evenly. By way of non-limiting example, process 1200 may be described herein with reference to operations discussed with respect to any of the circuits or systems discussed herein.

Figure 13:
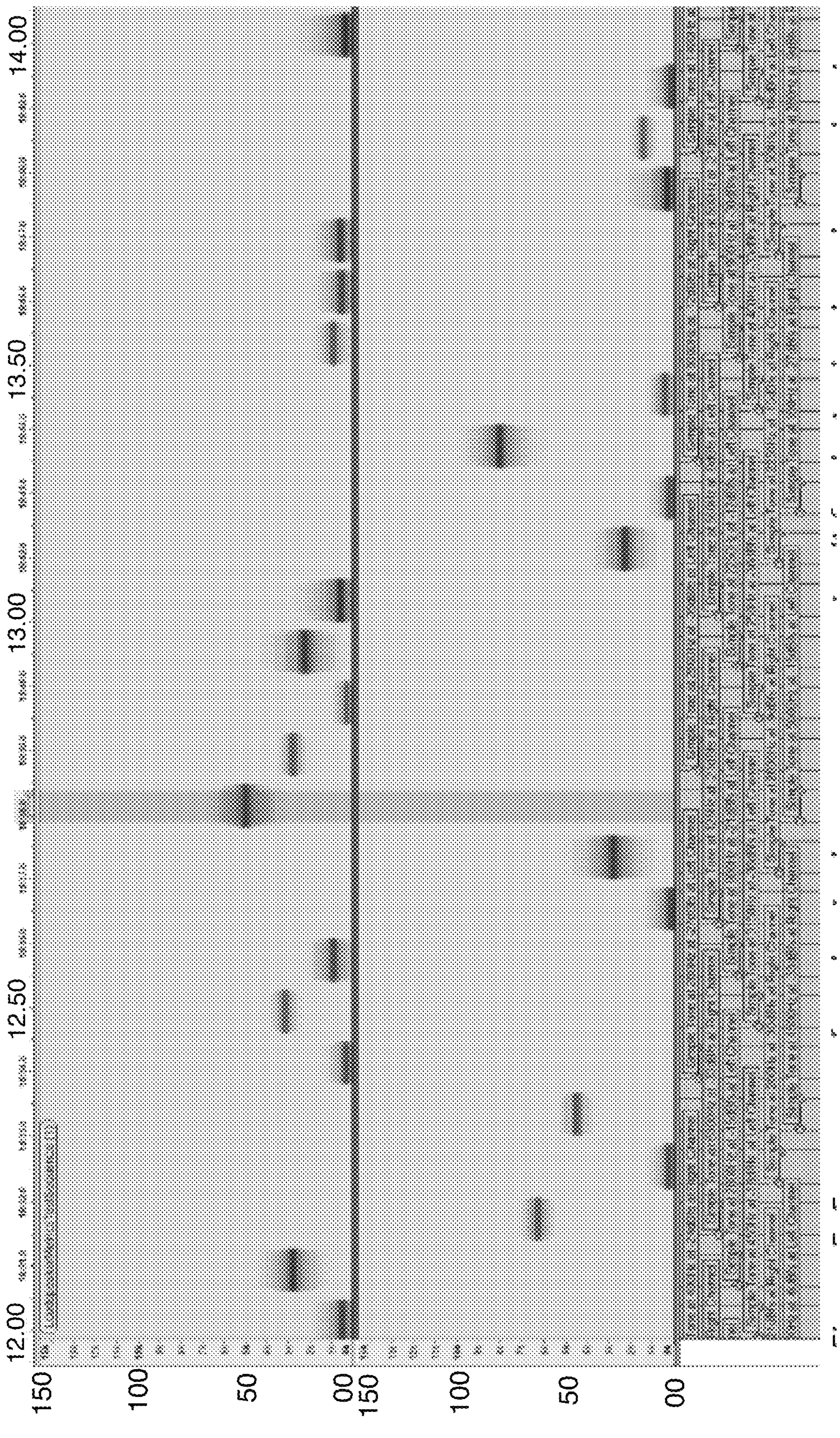
FIG. 13 is a flow chart for measuring non-linear distortion data of loudspeakers captured at various stimuli levels according to at least one of the implementations herein.

Process 1200 may include "emit audio of stepped sine and narrowband noise at various levels" 1202, and this may involve "use sequence with frequency sweeps" 1204. For example, the non-linear impulse response distortion data of loudspeakers may be captured at various stimuli levels. Particularly, the audio signal emitted may have frequency sweeps, stepped sines, and narrowband noise stimuli at the various levels. Such sequence may be stepped by a 3rd or smaller intervals with levels in a range better ensuring high SNR while maintaining a low total harmonic distortion. Such audio signal should be arranged to attempt to avoid triggering loudspeaker protection mechanisms in a smart-amplifier, for example, by playing high energy signals for a relatively long time without pausing for a voice coil cool-down. To achieve this, stimuli signals may be randomized and short high-level and low-level signals are alternated which results in at least a lower probability of triggering loudspeaker protection mechanisms. An example short fragment of the spectrum of a narrowband noise stimuli test sequence is shown on chart 1300 (FIG. 13) where time is along the horizontal axis and frequency in HZ (between 0 and 16 kHz) is along the vertical axis. The bottom of chart 1300 lists the frequency (Hz), SPL (dB), and all for a left channel. These details are not significant except that the overall signal pattern on the chart 1300 reveals the random changes from SPL to SPL.

Process 1200 may include "capture audio on DUT microphones" 1206, and as mentioned above where the captured audio signal may be processed for further applications and/or testing including IR computations.

Process 1200 may include "generate distortion data" 1208, where the non-linear distortion data may be computed (or extracted) by using the captured audio signal emitted from the audio device's own speakers.

Figure 14:
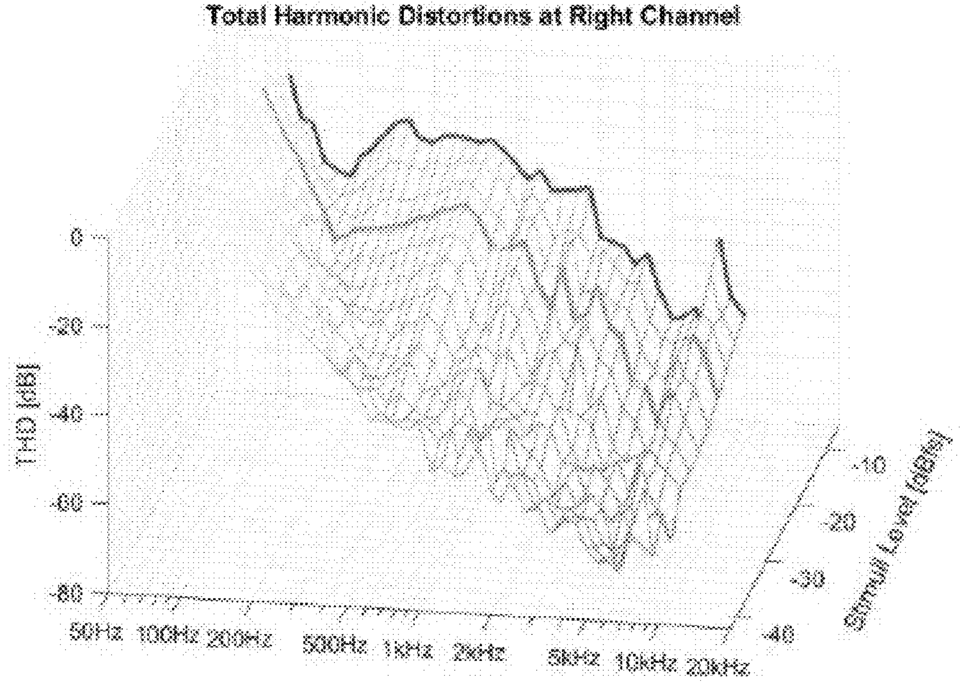
FIG. 14 is a graph showing total harmonic distortions versus frequency and level measurement for a loudspeaker according to at least one of the implementations herein.
Figure 15:
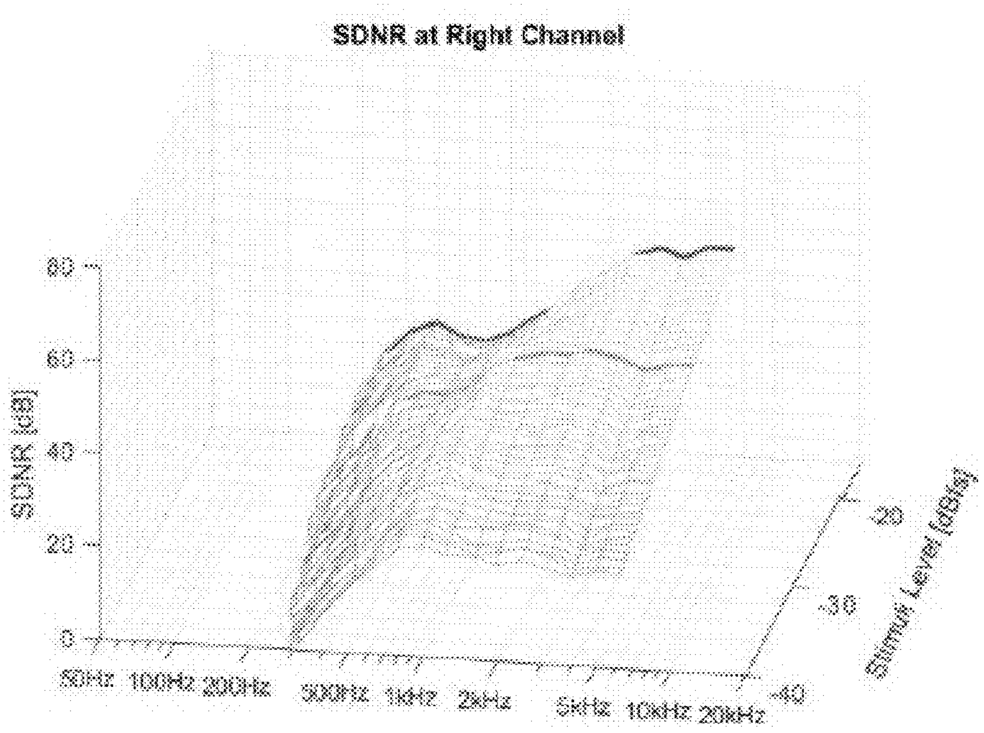
FIG. 15 is a graph showing signal-difference-to-noise ratio versus frequency and level measurement for a loudspeaker according to at least one of the implementations herein.

Process 1200 may include "generate non-linear distortion profile" 1209, which may include "measure harmonic distortions" 1210 and "measure signal-to-distortion and noise ratios" 1212. See https://docs.microsoft.com/en-us/windows-hardware/design/component-guidelines/audio. The non-linearity distortion data or profile of the echo path for the specific audio device as described above on audio device 1004 (FIG. 10) may be represented by measurements of total harmonic distortion (THD), total harmonic distortion plus noise (THD+N), and/or signal-to-distortion and noise ratio (SDNR) metrics. A THD chart 1400 (FIG. 14) for a right channel input or microphone when the playback audio stimuli are played through both a left and right channel loudspeaker shows THD graphed versus frequency (in Hz) for signals provided at various stimuli levels (in dB). A SDNR chart 1500 for the right channel shows very similar results as the THD chart except having stimuli and frequency graphed versus SDNR (in dB). SDNR results in a reversed trend compared to THD as these two metrics are inversed by nature as in: signal level compared against distortions in SDNR and distortion level compared against signal in THD. As these metrics are coherent with each other, the measured distortion profile may be used to tune the non-linear distortion coefficients for non-linear filters used to generate the simulated output as part of simulation tool as described below.

Optionally, a clock drift circuit 717 may be used to generate clock drift deviation parameters 1618 that can be considered part of the package as well. Some DUTs (such as inexpensive IoT devices) have lower quality clocking circuits. The poor quality clocks introduce varying sampling frequency of the input signal and may effectively cause time-based stretching of the incoming signals. Mismatches in this timing can cause errors in quality reported in the VCC and SRC reports. The clock drift circuit can estimate the clock drift parameter by calculating a frequency of the tone in an extracted clock control signal and measuring the deviation of that frequency from a known correct value. This deviation parameter can be placed in the package 1600 and subsequently used to simulate, and more precisely create, a clock drift in the audio signal in the simulation tool and similar to that created by the lower quality clocking circuits in order to generate a more accurate simulated output signal. It should be noted that clock drift correction, which is in contrast to, and separate from, this clock drift simulation operation here, also may be performed while generating impulse responses such as that disclosed by the 2020/0359146 publication cited above.

With the metrics described above, system 700 has the audio device data package building circuit 716 is arranged to collect the data including IRs, measurements, or parameters mentioned above to form a virtual acoustic device data package 718. The package is stored in a redistributable form such as with multiple data files for each device and including wave files for audio signals, impulse responses, and data structures encoded in JavaScript Object Notation (JSON) files by one example. The form can be modified easily to encrypted files or database records as needed. Thus, the package may include signals, metrics, and/or descriptors which allow for device simulations by many different audio applications.

Figure 16:
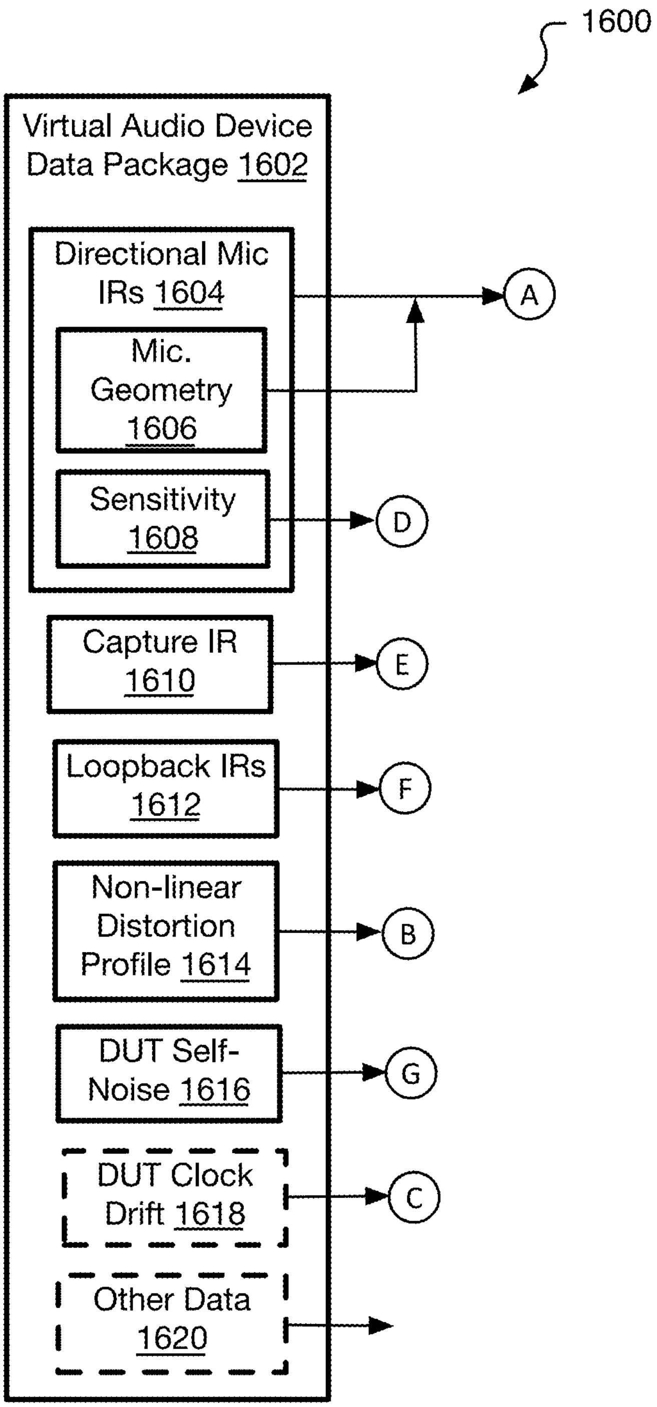
FIG. 16 is a schematic diagram of a virtual audio device data package according to at least one of the implementations herein.

Referring to FIG. 16, an example virtual audio device 1600 may be represented (or formed by) a virtual audio device data package 1602. The package 1600 may have directional microphone IRs (or just directional IRs) 1604 that were used to form microphone geometry data 1606 and directional sensitivity data 1608, both of which may be data on the package as well. The package also may have capture echo IR data 1610, loopback IR data 1612, non-linear distortion profile data 1614, and DUT self-noise data 1616 including samples at one or more levels. Each of these data types are already described above in detail.

The package 1602 also may have, or be associated with, DUT clock drift data 1618 that is a measure or parameter of clock drift as mentioned above, and the data may include a clock drift parameter that indicates a frequency deviation.

Other data 1620 may be considered to be part of the package and is transmitted as part of the package. This may include a 3D model of the device with the acoustic parameters of the materials, other representations of a sound field around the acoustic device (including ambisonics recording of the sound field in a real room) the sound diffraction parameters, materials used in the chassis that influence the internal coupling of the echo path, deeper parametrizations of all of those metrics (for example for chassis materials—their density or sound absorption coefficients) and others.

The packages 1602 may be stored in a database or memory, and if the simulated output is not being generated locally on the audio device, the packages may be formatted to be conveniently transmitted over a computer or other network to remote sites with a memory and simulation tool that can use the package to generate simulated output. The lettered flow connectors A-G indicate where the specific data is input to a simulation tool 1700 or 1800 (FIGS. 17-18) as follows.

It will be appreciated that the package 1602 may have less than all of the different types of data 1604-1618 shown and still provide at least some increase in alignment in ACE, VCC and SRC tests between different sites 334 or 336 (FIG. 3) without the need to physically ship the device. Thus, by one form, the package 1602 may contain at least two of the different types of data shown. By one form, the package 1602 provides at least the directional IRs, the capture echo IRs, the loopback IRs, the non-linear distortion IRs, and the self-noise samples. Many different combinations could be used instead.

Figure 17:
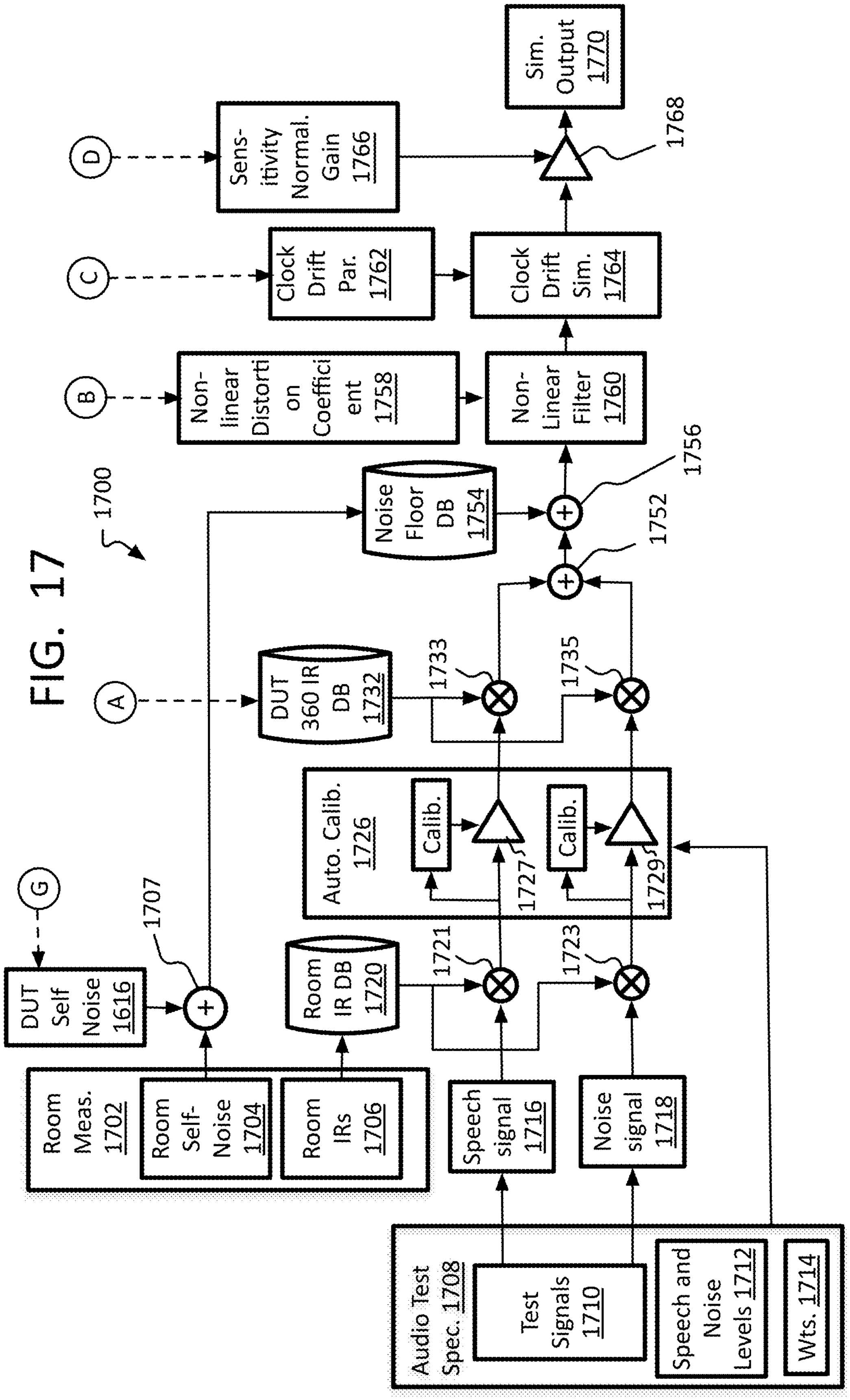
FIG. 17 is a schematic diagram of a simulation tool that uses the virtual audio device data package flow according to at least one of the implementations herein.

Referring to FIG. 17, a simulation tool (ST or simulation system) 1700 is arranged to use the virtual audio device data package 1600 to generate simulated output as if the audio device was recording audio in a variety of audio rooms and acoustic conditions. The ST 1700 here is arranged for external speaker testing of an audio device to test clean scenarios, with no or very little high-level background noise, and noisy scenarios with different background noises from around a room when the audio is emitted from external speakers. This is referred to as the clean and noisy scenarios. An ST 1800 (FIG. 18) is arranged for factoring playback testing where the audio is emitted from the internal speakers on an audio device being tested, and this may be referred to as a device playback scenario. Both example STs 1700 and 1800 are formed by circuits that operate software and hardware and/or firmware, or any combination of these, and may be described as an ST circuit.

The ST 1700 may have a room measurement unit 1702 to generate audio room-specific data that can be used to adjust speech and noise signals so that the speech and noise provide signal values as if the audio device was placed in one or more audio rooms with specific acoustic characteristics. The audio rooms that may be simulated may include an elongated far field room, a noisy cafeteria, and other rooms typical of commercial, office, residential, and/or educational buildings, as well as vehicle environments, and so forth. The room measurement unit 1702 may have a room self-noise unit 1704 that generates room self-noise signals by extracting noise from a recording of an acoustic background in an empty, quiet audio room with specific acoustic characteristics on the walls (which may include typical drywall for example) so that the quiet sounds of devices present in the room are captured, such as any electrical device in a kitchen for example, or heating, ventilating, and air conditioning (HVAC) devices typical in a building, for example, and so forth. The audio for the audio room may be captured using a reference-grade microphone in the room. The audio files with different acoustic conditions are also often distributed together with the definition of a VCC or SRC audio test.

The room measurement unit 1702 also may have a room IRs unit 1706 to generate impulse responses of the audio recorded in the audio room. By one form, the Room IRs may be gathered using a mono reference microphone (with no specific device characteristic). The audio room recording data (the room self-noise and room IRs) may be generated for any number and type of rooms as desired, may be predetermined, and may be provided via a data transmission network or delivery of one or more computer-readable medium and to an ST that can use the data. This is performed without the need to ship the audio device itself to perform audio room recording. Thus, the room data need only be obtained once for each specific variation of audio room with specific acoustic characteristics, and then updated as needed when different audio room acoustic characteristic variations are to be used. Acoustic characteristics here may refer to any of the shape and/or size of the audio room; the wall, ceiling, and/or floor construction and materials; and the items within the audio room including devices, furniture, people, and so forth, without any limit.

The room IRs may be stored in a room IR database (DB) 1720 until needed by the ST 1700. Separately, the room self-noise is summed by a sum unit 1707 and with the DUT self-noise from the virtual data package 1600, and which may be held in a memory or database 1616. This summed noise forms the noise floor for a certain audio room with certain acoustic characteristics, and may be stored in a noise floor database (DB) 1754 until needed as well.

Turning now to the input test speech signals 1716 and noise signals 1718, an audio test specification 1708 may provide test signals 1710 including standard signals from publicly available databases or customized signals instead. The test speech signals 1716 may be long speech samples or short fragments, and may be samples in compliance with certain certifications that are desired or provided according to acoustic measurement techniques that are to be used. The noise signals 1718 are noise samples that also may come from publicly available databases such as the European Telecommunications Standards Institute (ETSI) that provides databases with varying noise, such as for particular rooms such as a cafeteria, public spaces, living room, and so forth.

The test signals 1710 also may provide a speech signal for calibration described below, and the audio test specification 1708 may provide predetermined weights 1714 for the calibration as well. The weights bias the signals toward certain desired frequencies and are described in detail below. The audio test specification 1708 also may have target speech and noise levels 1712 which are used by a noise gain unit 1748 to control SPLs which may be in compliance with the requirements of certifications, tests, and reports mentioned above.

Once the speech signal 1716 and noise signal 1718 are obtained, the signals are convolved at convolvers 1721 and 1723 with the room IRs from the room IR DB 1720 to make the signals 1716 and 1718 room and acoustic characteristic-specific. Any of the convolutions mentioned herein may be performed by signal combining circuits that perform the required computations whether by one or more CPUs or fixed function circuits. The room-specific speech and noise signals then may be provided to the automatic calibration unit 1726 to control the SPLs as follows.

Figure 19:
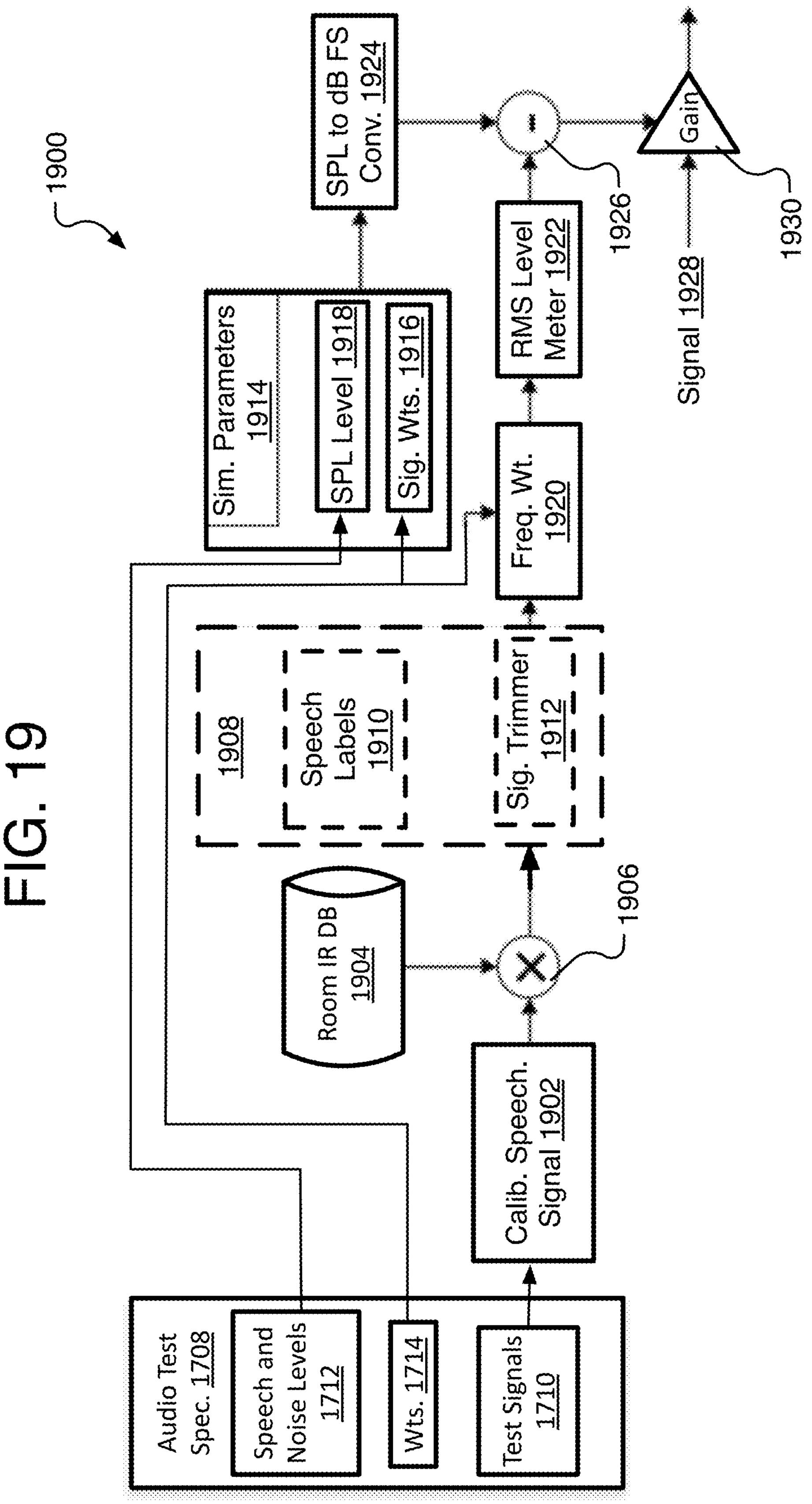
FIG. 19 is a schematic diagram of a calibration circuit of the simulation tools of FIGS. 17-18 and according to at least one of the implementations herein.

Referring to FIG. 19, a calibration circuit (or unit) 1900 may be the automatic calibration unit 1726 of ST 1700. The autocalibration unit 1900 controls and adjusts the SPLs of the speech and noise signals to maintain the SPLs within desired limits, and which may be calculated in relation to real life speech signals in air. A predetermined calibration speech signal 1902 from test signals 1710 may be provided to perform the calibration, and can be a fragment of a full speech signal automatically extracted by the ST 1700. Alternatively, the calibration signal can be prepared externally of the ST and given as a separate input. This allows a user to influence the calibration unit 1900 to provide the user additional usage flexibility. For example, the specification of a known personal assistant indicates usage of a specific pink noise signal as the in-air reference SPL, and the autocalibration feature can reproduce the signal being processed with the specified in-air SPL.

The calibration speech signal is then convolved at convolver 1906 with the room IRs from the room IR DB 1904, which may be the same as DB 1720, so that the signal becomes room and acoustic-characteristic-specific, as described above.

Then, optionally, a speech label unit 1910 may provide a speech label, and a signal trimmer unit 1912 may trim the signal down (in length) to a time period providing the speech label according to a certain specification, which refers to certain timestamps where the active speech is present in the input audio file. This labelling helps the calibration circuit 1900 to have accurate readings and adjust the gain 1930 accordingly to active speech levels.

Separately, a simulation parameters unit 1914 has desired SPLs 1918 and signal weights 1916 both obtained from the speech and noise levels unit 1712 and weights unit 1714, respectively. The calibration sets the speech or noise signal to the level of the SPLs 1918. The weights 1714 and 1916 are provided to change the SNR of the signal to better correlate with human-perceived loudness and can be standard signal weighting curves. See for example, www.cirrus-research.co.uk/blog/2020/03/what-are-a-c-z-frequency-weightings. The weights are often specified per user scenario in the Audio Test Specification 1708. The weights from the weight unit 1714 also are provided to a frequency-weighting unit 1920. The now room-specific input signal, whether or not trimmed to speech labels, then may be provided to the frequency-weighting unit 1920 to apply the weights to emphasize frequencies according to a given specification.

The room-specific signal now with weighted frequencies is provided to a root mean square level meter 1922 that determines the mean level of the frequencies of the signal, and this may be in digital full-scale decibels (dB FS). In parallel, the SPL from the simulation parameters unit 1914 is provided to a convertor 1924 to convert the SPL to dB FS using real speech-enabled device sensitivity defined in dB FS/Pa, and where the signal weights 1915 are used in the conversion. The resulting dB FS level is the reference level for the input signal. The resulting reference dB FS level is then compared, by a differencing unit 1926 for example, to the level of the input signal, here being the room-specific, frequency-weighted signal from the RMS level meter 1922. The result or difference of the comparison of reference level and measured signal level is applied as an amplification gain 1930 to the speech signal processed in the pipeline of the ST 1700, and at gain applier (or amplifier) 1727. This is repeated for the noise signal 1718 to generate a calibration noise amplification gain as well at gain amplifier 1729.

The signals may be calibrated to generate the exact (or close to exact) in-air equivalent signal levels, and the calibration may be performed before the device characteristics are applied using the directional IRs from a DUT 360° IR database 1732 (FIG. 17) that receives the directional IRs from the virtual data package 1600. This is performed in this order because the DUT IRs have sensitivity per angle (directivity) and frequency response information included in the IR signal. Applying these on top of the calibrated room-specific signal better ensures alignment in real audio room certification measurements.

The use of the calibration better ensures that the characteristics are reproduced at desired SPLs and still have relatively high precision while maintaining the device characteristics intact. Thus, the calibration unit 1726 mimics a calibration procedure often performed in the audio path quality testing in a real audio room. The frequency weighting and the SPL reference comparison enable the calibration to simulate recordings with signal-to-noise ratio (SNR) ranges taken directly from a specific audio testing specification, for example one of the personal assistant specifications.

Returning to the ST 1700, and before or after the directional IRs 1604 from the virtual audio device data package 1600 are input to the ST 1700, the directional IRs may be scaled to represent speech-enabled device sensitivity and microphone geometry on the audio device and in relation to the reference microphone 616 (FIG. 6). The adjusted directional IRs may be stored in the DUT 360 IR database 1732. The directional IRs then may be convolved with the now calibrated speech and noise signals at convolvers 1733 and 1735.

Once the speech and noise signals are adjusted for the SPLs during calibration, additional SNR refinement can be made but is not shown here. Otherwise, the calibrated speech and noise signals are summed together at sum unit 1752, and the resulting sum signal is itself summed at a sum unit 1756 to the noise floor from the noise floor database 1754. Thereafter, the signal is further adjusted by a non-linear (distortion) filter unit or circuit 1760, a clock drift simulation (or compensation) unit or circuit 1764, and a (direction) sensitivity normalization gain adder or amplifier 1768, and each of these is based on different data associated with the virtual audio device data package 1600. Specifically, a non-linear distortion coefficient unit 1758 receives the non-linear distortion profiles 1614 and generates coefficients from the signals by using THD measurements in the profiles for example.

A clock drift parameter unit 1762 receives and holds the clock drift parameters 1618 from the virtual audio device data package 1600, and provides them to the clock drift simulation (or compensation) unit 1764 to apply the deviation parameter to de-synchronize the clock of the signal in order to simulate clock drift as would usually happen with small devices. Specifically, the clock drift simulation unit 1764 may be arranged to generate the measured frequency deviation to cause a clock drift in the extracted test sequence that may occur in order to form more accurate simulated output.

A sensitivity normalization gain unit receives the sensitivity data 1608 from the virtual audio device data package 1600 and generates a gain as follows. The autocalibration operation scales the analyzed signal and noise levels to appropriate in-air equivalent levels (SPL) expressed in dB20uPa (dB above 20 micropascals). For example, speech can be adjusted to 65dB20uPa which is a typical speech level from close distance. An audio device has some sensitivity value at which it captures sound. This sensitivity value is expressed in dBfs/Pa, and it is a translation value for audio signals from the in-air domain to the digital signal domain. When sensitivity is measured in an anechoic chamber, its value can be used to generate a sensitivity gain. The gain actually may be sensitivity expressed in dBfs/Pa minus 94 dB, where 94 is a difference between two reference pressure levels used in the industry (20uPa and 1 Pa). The gain is then applied to the signal as well.

The resulting output audio signal or audio stream is the simulated output 1770 that can be used as the output audio signal as if the audio device was placed in an audio room specific to the output signal and when audio emitted from external speakers was captured on the microphones of the audio device. It should be noted that post-processing (relative to the simulated output generation or otherwise referred to as pre-processing for subsequent applications) should be performed on the simulated output 1770 that is typically performed before inputting the simulated output to subsequent audio processing applications.

Figure 18:
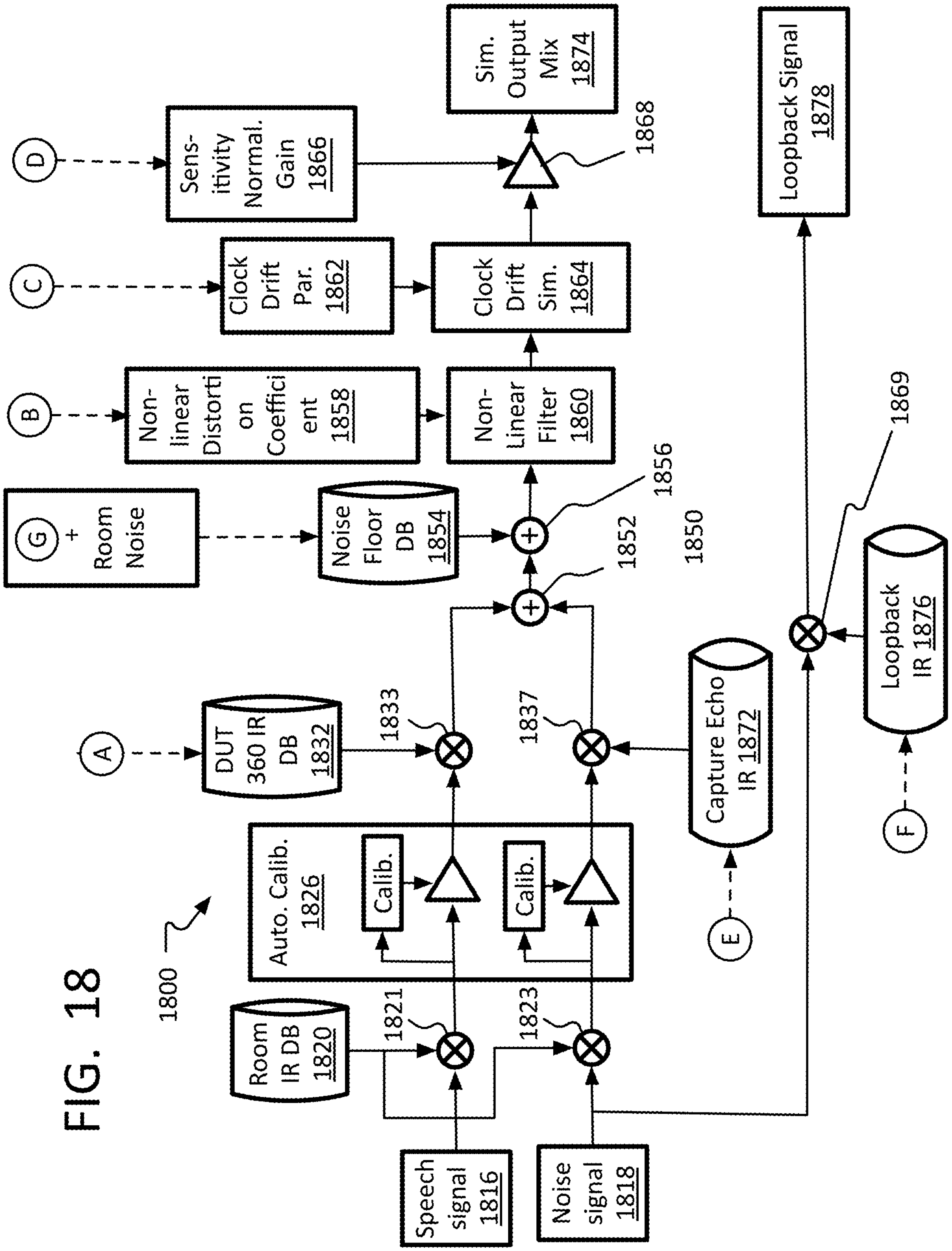
FIG. 18 is a schematic diagram of another simulation tool that uses the virtual audio device data package flow according to at least one of the implementations herein.

Referring to FIG. 18, an ST 1800 is provided for playback where the simulated output audio factors audio emissions from the audio device's own internal speakers. The ST 1800 may have the same or similar arrangement as ST 1700, using most of the same circuitry (or units or components). The audio test specification and room measurement unit is not shown but both are used similarly for ST 1800. Those units on ST 1800 that are the same or similar to that on ST 1700 are not described again. At least some of the differences here, however, is that a capture echo IR database 1872 receives capture echo (or linear echo) IRs 1610 from the virtual audio device data package 1600. The captured echo IRs are then convolved at convolver 1837 with the calibrated noise signal 1818, while the directional IRs are still convolved with the calibrated speech signal at the convolver 1833.

Also, a loopback IR database 1876 holds loopback IRs. The loopback IRs are convolved at a convolver 1869 with the initial noise signal 1818, at least before being made room-specific and before calibration, to generate an output loopback signal 1878 which can be used as a reference stream for subsequent acoustic echo cancellation, for example. All of the other audio device data types from the package 1600 may be input to the ST 1800 similar to the input of ST 1700.

The result is simulated output mix 1874 that is simulated output with signals that reflect audio emitted from both the audio device, such as internal speakers, as well as audio emitted from external sources such as noise, speech sources, and external speakers.

Thus, a virtual audio device data package obtained by performing the measurements described above can be used as an input to a simulation tool (ST). It can be a software application capable of generating a processed speech recording, having all or most components found in a typical acoustic certification recording and more, as if the audio was recorded on a target platform. So in other words, the method and system disclosed herein combines speech and distractor noise data with impulse responses of a target room and a target platform in order to achieve simulated output data that is sufficiently accurate to be used as actual output data.

The STs 1700 and 1800 used herein are easily scalable and have high convergence with actual lab recordings on both signal and target usage level (such as speech recognition metrics). A set of platform IRs available from the virtual audio device data packages and to the ST can be easily expanded or modified, enabling simulation of any latest product configuration as if the configuration has undergone a certification process. Once simulated output has been generated, signal quality can be verified using standard metrics or the simulated output could be further processed with a stand-alone pre-processing engine. The latter is a software solution implementing any of the audio pre-processing found in an input stage of many different audio-enabled products. When fed with the ST output, audio applications can generate an audio stream substantially or perfectly imitating one that would be output by a pre-processing module of a firmware and/or software stack on a target platform.

Also, both the clean and noisy scenario ST 1700 and the device playback scenario ST 1800 may be used to provide other outputs such as a processed speech output file that is the test speech signal after calibration and SNR adjustment added to the noise signal and further adjusted for direction sensitivity. Also, a total noise output file may be provided and is the difference between the processed speech output file (without the direction sensitivity adjustment) and the summed noise and speech signal modified by the non-linear distortion filter and the clock drift simulator. A noise floor output file is the noise floor obtained from the noise floor database and adjusted by the direction sensitivity, and a processed noise output file is the noise signal after calibration adjustment, SNR adjustment, noise gain adjustment, and direction sensitivity adjustment. These further outputs may be provide to form reports and/or for use by subsequent audio processing applications.

Any combination of these outputs as desired may be used to generate the ACE, VCC, and/or SRC reports mentioned above, and without shipping the audio device to remote locations, and without actually placing the audio device itself in even one physical audio room other than the anechoic chamber.

Finally, the output audio stream can be used as an input to an automatic speech recognition (ASR) engine, wake word detection engine (such as WoV), or many other speech quality evaluation algorithms such as perceptual evaluation of speech quality (PESQ), perceptual objective listening quality analysis (POLQA), or virtual speech quality objective listener (VISQOL) to produce a quantified metric of a given device in typical testing routine, to name a few examples.

Experimental Result

Multiple virtual audio device data packages were tested for their convergence with actual lab results. They were created as a part of standard measurement procedures, and in the ST development process, to ensure the proposed method's quality and maturity. The results below recite "Exp" for expected and "Sim" for simulated. All values are in dB scale.

Table 1. Example Signal Result of a Virtual Acoustic Device Package after Processing

| Id | ExpSpeech-Level | SimSpeech-Level | ExpNoise-Level | SimNoise-Level | Exp-SNR | Sim-SNR |
|---|---|---|---|---|---|---|
| 1 | −56.99 | −56.84 | −79.80 | −79.38 | 22.7 | 22.54 |
| 2 | −48.92 | −48.67 | −55.76 | −55.25 | 5.78 | 6.58 |
| 3 | −48.93 | −48.72 | −55.85 | −55.26 | 5.90 | 6.53 |
| 4 | −55.36 | −55.63 | −74.08 | −76.50 | 18.65 | 20.87 |
| 5 | −48.26 | −48.48 | −62.01 | −62.29 | 13.56 | 13.81 |
| 6 | −47.50 | −47.77 | −54.68 | −55.10 | 6.24 | 7.32 |
| 7 | −61.34 | −61.51 | −73.72 | −76.50 | 12.12 | 14.99 |
| 8 | −53.90 | −53.97 | −62.00 | −62.29 | 7.36 | 8.32 |

As shown, simulated levels are extremely close to the actual levels in most cases, thereby providing very accurate simulated output. The testing method and system recreate the device as a whole system including simulations of such elements as the influence of the device's aspect ratio on (1) acoustics, (2) self-noise, (3) internal clock drift, (4) dependence on the speaker housing, and (5) the distance from the microphones. The present method offers IR measurement around the device, at every angle. Other device measurements added include echo leakage from microphones to speakers, IR echo path, and its non-linear distortion. All these additional parameters ensure a better correlation of the simulation with recordings from real devices.

Figure 20:
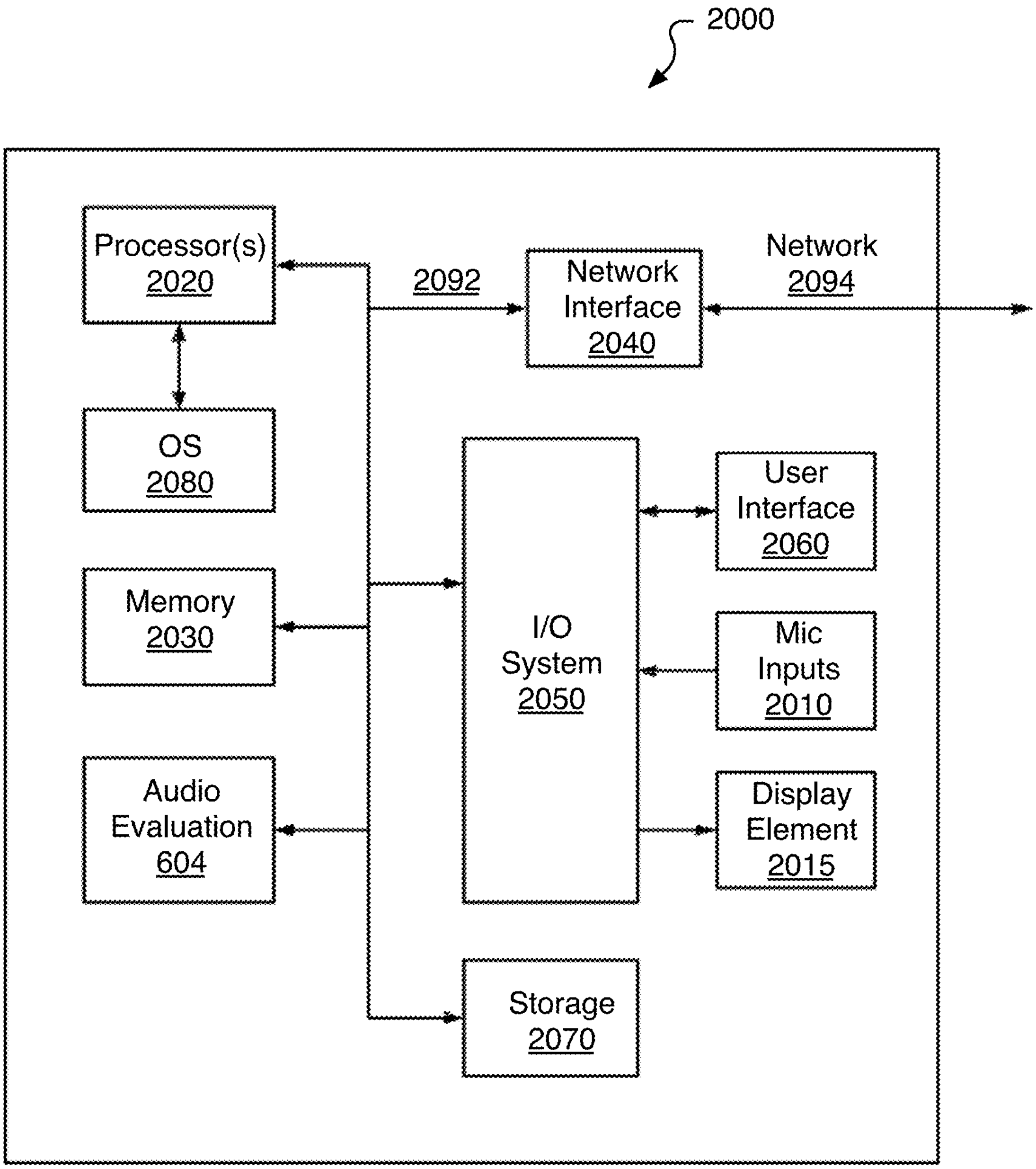
FIG. 20 is an illustrative diagram of an example system.

Referring to FIG. 20, an example computing system or platform 2000 is arranged to perform audio capture evaluation in accordance with at least one implementation of the present disclosure. Is some examples, the audio device has the platform 2000 and both collects audio signals and performs the audio processing mentioned herein. In other examples, the platform 2000 is a networked system that generates virtual audio device data packages that are transmitted to other devices to generate simulated output for example. By yet other examples, the audio device collects audio signals through it microphones but subsequent audio processing to generate the virtual audio device data package and simulated output is performed by one or more devices remote from the audio device collecting the audio signals. Other examples may be included here as well where some part of the audio processing mentioned above is performed by one or more remote devices rather than the audio device itself.

In some implementations, platform 2000 may be hosted on, or otherwise incorporated into a personal computer, workstation, server system, laptop computer, ultra-laptop computer, tablet, touchpad, portable computer, handheld computer, palmtop computer, personal digital assistant (PDA), cellular telephone, combination cellular telephone and PDA, smart device (for example, smartphone, smart-speaker, or smart-tablet), mobile internet device (MID), messaging device, data communication device, embedded system, and so forth. Any combination of different devices may be used in certain implementations.

In some implementations, platform 2000 may comprise any combination of a processor(s) 2020, a memory 2030, an audio evaluation system 604, a network interface 2040, an input/output (I/O) system 2050, a user interface 2060, microphone inputs 2010, a display element 2015, and a storage system 2070. Also, a bus and/or interconnect 2092 is also provided to allow for communication between the various components listed above and/or other components not shown. Platform 2000 can be coupled to a network 2094 through network interface 2040 to allow for communications with other computing devices, platforms, devices to be controlled, or other resources. Other componentry and functionality not reflected in the platform 200 will be apparent in light of this disclosure, and it will be appreciated that other implementations are not limited to any particular hardware configuration.

Processor(s) 2020 can include any suitable one or more processors, such as an Intel Atom® by one example, and may include one or more coprocessors or controllers, such as an audio processor, a graphics processing unit (GPU), or hardware accelerator, to assist in control and processing operations associated with platform 2000. In some implementations, the processor 2020 may be implemented as any number of processor cores. The processor (or processor cores) may be any type of processor, such as, for example, a micro-processor, an embedded processor, a digital signal processor (DSP), a graphics processor (GPU), a tensor processing unit (TPU), a network processor, a field programmable gate array or other device configured to execute code. The processors may be multithreaded cores in that they may include more than one hardware thread context (or "logical processor") per core. Processor 2020 may be implemented as a complex instruction set computer (CISC) or a reduced instruction set computer (RISC) processor. In some implementations, processor 2020 may be configured as an x86 instruction set compatible processor.

Memory 2030 can be implemented using any suitable type of digital storage including, for example, flash memory and/or random-access memory (RAM). In some implementations, the memory 2030 may include various layers of memory hierarchy and/or memory caches. Memory 2030 may be implemented as a volatile memory device such as, but not limited to, a RAM, dynamic RAM (DRAM), or static RAM (SRAM) device. Storage system 2070 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some implementations, storage 2070 may comprise technology to increase the storage performance enhanced protection for valuable digital media when multiple hard drives are included.

Processor 2020 may be configured to execute an Operating System (OS) 2080 which may comprise any suitable operating system, such as Google Android (Google Inc., Mountain View, CA), Microsoft Windows (Microsoft Corp., Redmond, WA), Apple OS X (Apple Inc., Cupertino, CA), Linux, or a real-time operating system (RTOS). As will be appreciated in light of this disclosure, the techniques provided herein can be implemented without regard to the particular operating system provided in conjunction with platform 2000, and therefore may also be implemented using any suitable existing or subsequently developed platform.

Network interface circuit 2040 can be any appropriate network chip or chipset which allows for wired and/or wireless connection between other components of platform 2000 and/or network 2094, thereby enabling platform 2000 to communicate with other local and/or remote computing systems, servers, cloud-based servers, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution) and 5G, Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 2050 may be configured to interface between various I/O devices and other components of platform 2000. I/O devices may include, but not be limited to, user interface 2060, microphone inputs 2010 (e.g., to receive signals from the DUT microphones and the reference microphone), and display element 2015. In some implementations, the display element 2015 may be employed to display result of audio capture evaluation. User interface 2060 may include devices (not shown) such as a touchpad, keyboard, and mouse, etc. I/O system 2050 may include a graphics subsystem configured to perform processing of images for rendering on the display element. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some implementations, the graphics subsystem could be integrated into processor 2020 or any chipset of platform 2000.

It will be appreciated that in some implementations, the various components of platform 2000 may be combined or integrated in a system-on-a-chip (SoC) architecture as mentioned above. In some implementations, the components may be hardware components, firmware components, software components or any suitable combination of hardware, firmware or software.

Audio capture evaluation system 604 is configured to evaluate the audio capture path of the microphones of the DUT at least including generating a virtual audio device data package as described previously, and may also include one or more simulation tools to use the package and generate simulated output also as described above. The audio capture evaluation system 604 may include any or all of the circuits and/or components illustrated in any of the figures mentioned above Figures. These components can be implemented or otherwise used in conjunction with a variety of suitable software and/or hardware that is coupled to or that otherwise forms a part of platform 2000. These components can additionally or alternatively be implemented or otherwise used in conjunction with user I/O devices that are capable of providing information to, and receiving information and commands from, a user.

These circuits either may be installed local to platform 2000, or alternatively, platform 2000 can be implemented in a client-server arrangement wherein at least some functionality associated with these circuits is provided to platform 2000 using an applet for example, such as a JavaScript applet, or other downloadable module or set of sub-modules. Such remotely accessible modules or sub-modules can be provisioned in real-time, in response to a request from a client computing system for access to a given server having resources that are of interest to the user of the client computing system. In such implementations, the server can be local to network 2094 or remotely coupled to network 2094 by one or more other networks and/or communication channels. In some cases, access to resources on a given network or computing system may require credentials such as usernames, passwords, and/or compliance with any other suitable security mechanism.

In various implementations, platform 2000 may be implemented as a wireless system, a wired system, or a combination of both. When implemented as a wireless system, platform 2000 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, platform 2000 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various implementations may be implemented using hardware elements, software elements, or a combination of both. Examples of hardware elements may include processors, microprocessors, circuits with circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an implementation is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some implementations may be described using the expression "coupled" and "connected" along with their derivatives. These terms are not intended as synonyms for each other. For example, some implementations may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various implementations disclosed herein can be implemented in various forms of hardware, software, firmware, and/or special purpose processors. For example, in one implementation at least one non-transitory computer readable storage medium has instructions encoded thereon that, when executed by one or more computing devices with one or more processors, cause one or more of the methodologies disclosed herein to be implemented. The instructions can be encoded using a suitable programming language, such as C, C++, object-oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one implementation, the system can be hosted on a given website and implemented, for example, using JavaScript or another suitable browser-based technology. For instance, in certain implementations, the system may leverage processing resources provided by a remote computer system accessible via network 2094. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other implementations are not limited to any particular hardware or software configuration. Thus, in other implementations platform 2000 may comprise additional, fewer, or alternative subcomponents as compared to those included in the example implementation of FIG. 20.

The aforementioned non-transitory computer readable medium may be any suitable medium for storing digital information, such as a hard drive, a server, a flash memory, and/or random-access memory (RAM), or a combination of memories. In alternative implementations, the components and/or modules disclosed herein can be implemented with hardware, including gate level logic such as a field-programmable gate array (FPGA), or alternatively, a purpose-built semiconductor such as an application-specific integrated circuit (ASIC). Still other implementations may be implemented with a microcontroller having a number of input/output ports for receiving and outputting data, and a number of embedded routines for carrying out the various functionalities disclosed herein. It will be apparent that any suitable combination of hardware, software, and firmware can be used, and that other implementations are not limited to any particular system architecture.

Some implementations may be implemented, for example, using a machine readable medium or article which may store an instruction or a set of instructions that, if executed by a machine, may cause the machine to perform a method, process, and/or operations in accordance with the implementations. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating." "determining." or the like refer to the action and/or process of a computer or computing system, or similar electronic computing device, that manipulates and/or transforms data represented as physical quantities (for example, electronic) within the registers and/or memory units of the computer system into other data similarly represented as physical entities within the registers, memory units, or other such information storage transmission or displays of the computer system. The implementations are not limited in this context.

The terms "circuit" or "circuitry," as used in any implementation herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor ("processor circuitry") and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smartphones, etc. Other implementations may be implemented as software executed by a programmable control device. In such cases, the terms "circuit" or "circuitry" are intended to include a combination of software and hardware such as a programmable control device or a processor capable of executing the software. As described herein, various implementations may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the implementations. It will be understood by an ordinarily skilled artisan, however, that the implementations may be practiced without these specific details. In other instances, well known operations, components and circuits have not been described in detail so as not to obscure the implementations. It can be appreciated that the specific structural and functional details disclosed herein may be representative and do not necessarily limit the scope of the implementations. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

The following examples pertain to additional implementations.

By an example one or more first implementations, at least one non-transitory machine-readable storage medium having instructions thereon that, when executed, cause a computing device to operate by: receiving audio signals captured at one or more microphones of an audio device; generating at least one virtual audio device data package of the audio device comprising generating device specific audio characteristic data by using the audio signals; and providing the virtual audio device data package to be used to generate simulated audio output that simulates audio output as if the audio device is placed in multiple different acoustic characteristic settings.

By one or more second implementation, and further to the first implementation, wherein the device specific audio characteristic data comprises self-noise data related to self-noise of the audio device.

By one or more third implementations, and further to the first implementation, wherein the device specific audio characteristic data comprises self-noise data related to self-noise of the audio device, and wherein the self-noise is related to a least one of: a fan on the audio device, at least one power supply on the audio device, chassis vibration of the audio device, microphone diaphragm inertia of the audio device, analog/digital converters of the audio device, and processing-related audio emissions from the audio device.

By one or more fourth implementations, and further to the first implementation, wherein the device specific audio characteristic data comprises self-noise data related to self-noise of the audio device, and wherein the self-noise data is generated by having the audio device record intended silence through one or more microphones within audible range of the audio device.

By one or more fifth implementations, and further to any of the first to fourth implementation, wherein the device specific audio characteristic data comprises impulse response data related to capture echo impulse responses determined by emitting audio from one or more speakers of the audio device and received by one or more microphones on the audio device and in an anechoic chamber.

By one or more sixth implementations, and further to any of the first to fourth implementation, wherein the device specific audio characteristic data comprises impulse response data related to capture echo impulse responses determined by emitting audio from one or more speakers of the audio device and received by one or more microphones on the audio device and in an anechoic chamber, and wherein the impulse responses include non-reverberation impulse responses separate from reverberation impulse responses.

By one or more seventh implementations, and further to any of the first to sixth implementation, wherein the device specific audio characteristic data factors echo leakage.

By one or more eighth implementations, and further to any of the first to seventh implementation, wherein the device specific audio characteristic data comprises loopback impulse responses generated by obtaining audio data from a loopback channel rather than data of the audio signal as obtained over the air through microphones.

By one or more ninth implementations, and further to any of the first to eighth implementation, wherein the device specific audio characteristic data comprises non-linear distortion profiles of audio emitted from one or more speakers on the audio device and captured at the audio device.

By one or more tenth implementations, and further to the first implementation, wherein the device specific audio characteristic data comprises: (1) self-noise data related to self-noise of the audio device, (2) capture echo impulse response data related to linear impulse responses determined by emitting audio from one or more speakers of the audio device and received by one or more microphones on the audio device, (3) non-linear distortion profiles of audio emitted from one or more speakers on the audio device and captured at the audio device, and (4) loopback data generated by obtaining audio data from a loopback channel rather than data of the audio signal as obtained over the air through microphones.

By one or more eleventh implementations, and further to any of the first to ninth implementation, wherein the device specific audio characteristic data comprises directional impulse response data obtained by directing audio from at least one external speaker at multiple different measurement angles relative to one or more microphones on the audio device.

By an example one or more twelfth implementations, a computer-implemented method of audio device testing comprising: receiving audio signals captured at one or more microphones of an audio device; generating at least one virtual audio device data package of the audio device comprising generating device specific audio characteristic data by using the audio signals; and providing the virtual audio device data package to be used to generate simulated audio output that simulates audio output as if the audio device is placed in multiple different acoustic characteristic settings.

By an example thirteenth implementation, and further to the twelfth implementation, wherein a recording of audio including the audio signal and used to generate the device specific audio characteristic data comprises a recorded sequence with at least one pure tone part, at least one maximum length sequence (MLS) part, and at least one sweep sine sequence part.

By one or more fourteenth implementations, and further to the twelfth implementation, wherein a recording of audio including the audio signal and used to generate the device specific audio characteristic data comprises a recorded sequence with at least one pure tone part, at least one maximum length sequence (MLS) part, and at least one sweep sine sequence part, and wherein the recording of audio comprises at least one sequence of intended silence.

By one or more fifteenth implementations, and further to the twelfth or fourteenth implementation, wherein the device specific audio characteristic data comprises at least two of: (1) self-noise data related to self-noise of the audio device, (2) capture echo impulse response data related to linear impulse responses determined by emitting audio from one or more speakers of the audio device and received by one or more microphones on the audio device, (3) non-linear distortion profiles of audio emitted from one or more speakers on the audio device and captured at the audio device, and (4) loopback impulse responses generated by obtaining audio data from a loopback channel rather than data of the audio signal as obtained over the air through microphones.

By one or more sixteenth implementations, and further to any of the twelfth to fifteenth implementation, wherein the method comprising transmitting the virtual audio device data package to a location remote from a location having the audio device; and using the virtual audio device data package to generate simulated output as if the audio device is being physically placed in multiple different audio rooms each with different acoustic characteristics.

By one or more seventeenth implementations, and further to any of the twelfth to sixteenth implementation, wherein the method comprising inputting at least some data types of the virtual audio device data package into a simulation tool to generate simulated output to be in response at least to audio emitted from speakers of the audio device; and inputting a different combination of the data types into a simulation tool to generate simulated output to be in response to audio emitted from speakers external of the audio device.

By one or more eighteenth implementations, and further to any of the twelfth to sixteenth implementation, wherein the method comprising inputting at least some data types of the virtual audio device data package into a simulation tool to generate simulated output to be in response at least to audio emitted from speakers of the audio device; and inputting a different combination of the data types into a simulation tool to generate simulated output to be in response to audio emitted from speakers external of the audio device, and wherein loopback impulse responses and echo impulse responses of the virtual audio device data package are arranged to be input to a simulation tool to generate simulated output to be in response to audio emitted from speakers on the audio device.

By one or more nineteenth implementations, and further to any of the twelfth to eighteenth implementation, wherein the virtual audio device data package comprises clock drift parameter data.

By an example one or more twentieth implementations, a computer-implemented system of audio device evaluation comprising: memory to store at least audio signals captured by one or more microphones of an audio device; processor circuitry communicatively coupled to the memory and being arranged to operate by: generating at least one virtual audio device data package of the audio device comprising generating device specific audio characteristic data by using the audio signals; and providing the virtual audio device data package to be used to generate simulated audio output that simulates audio output as if the audio device is placed in multiple different acoustic characteristic settings.

By one or more twenty-first implementations, and further to the twentieth implementation, wherein the device specific audio characteristic data comprises at least two of: (1) self-noise data related to self-noise of the audio device, (2) capture echo impulse response data related to linear impulse responses determined by emitting audio from one or more speakers of the audio device and received by one or more microphones on the audio device, (3) non-linear distortion profiles of audio emitted from one or more speakers on the audio device and captured at the audio device, and (4) loopback data obtained by generating impulse responses of audio data obtained from a loopback channel rather than data of the audio signal as obtained over the air through microphones.

By one or more twenty-second implementations, and further to the twentieth implementation, wherein the virtual audio device data package comprises self-noise data related to self-noise of the audio device while the audio device is in an anechoic chamber.

By one or more twenty-third implementations, and further to the twentieth implementation, wherein the virtual audio device data package comprises self-noise data related to self-noise of the audio device while the audio device is in an anechoic chamber, and wherein the audio device is arranged to record audio while no device is playing audio.

By one or more twenty-fourth implementations, and further to any of the twentieth implementation, wherein the virtual audio device data package comprises self-noise data related to self-noise of the audio device while the audio device is in an anechoic chamber, and wherein the audio device is arranged to record audio while audio is being emitted with a sequence that is silent in addition to other sequences that are not silent.

By one or more twenty-fifth implementations, and further to any of the twenty-first to twenty-fourth implementation, wherein the virtual audio device data package comprises both linear echo impulse response data and non-linear distortion profiles both being associated with audio emitted from the audio device.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. At least one non-transitory machine-readable storage medium having instructions thereon that, when executed, cause a computing device to operate by:

receiving audio signals captured at one or more microphones of an audio device;

generating a virtual audio device data package of the audio device comprising generating device specific audio characteristic data based on the audio signals, wherein the device specific audio characteristic data comprises loopback impulse responses generated by obtaining audio data from a loopback channel; and providing the virtual audio device data package to a simulation unit;

accessing a database including a plurality of acoustic characteristic sets, representing a plurality of corresponding acoustic environments;

generating, by the simulation unit, a plurality of simulated audio outputs that each simulate audio output based on corresponding sets of the plurality of acoustic characteristic sets.

2. The medium of claim 1 wherein the device specific audio characteristic data comprises self-noise data related to self-noise of the audio device.

3. The medium of claim 2 wherein the self-noise is related to a least one of: a fan on the audio device, at least one power supply on the audio device, chassis vibration of the audio device, microphone diaphragm inertia of the audio device, analog/digital converters of the audio device, and processing-related audio emissions from the audio device.

4. The medium of claim 2 wherein the the self-noise data is generated by having the audio device record intended silence through one or more microphones within audible range of the audio device.

5. The medium of claim 1 wherein the virtual audio device data package is arranged so that generating the plurality of simulated audio outputs comprises applying both (1) data from the virtual audio device data package and (2) predetermined audio room-specific noise signal(s) or impulse response(s) or both to a test signal.

6. The medium of claim 5 wherein the impulse responses include non-reverberation impulse responses separate from reverberation impulse responses.

7. The medium of claim 1 wherein the device specific audio characteristic data comprises impulse response data related to capture echo impulse responses determined by emitting audio from one or more speakers of the audio device and received by the one or more microphones on the audio device and in an anechoic chamber.

8. The medium of claim 1 wherein the device specific audio characteristic data comprises non-linear distortion profiles of audio emitted from one or more speakers on the audio device and captured at the audio device.

9. The medium of claim 1 wherein the device specific audio characteristic data comprises: (1) self-noise data related to self-noise of the audio device, (2) capture echo impulse response data related to linear impulse responses determined by emitting audio from one or more speakers of the audio device and received by one or more microphones on the audio device, (3) non-linear distortion profiles of audio emitted from one or more speakers on the audio device and captured at the audio device, and (4) loopback data generated by obtaining audio data from a loopback channel rather than data of the audio signal as obtained over the air through microphones.

10. The medium of claim 1 wherein the device specific audio characteristic data comprises directional impulse response data obtained by directing audio from at least one external speaker at multiple different measurement angles relative to the one or more microphones on the audio device.

11. The medium of claim 1, further comprising emitting audio from one or more speakers of the audio device, and wherein the audio data obtained from the loopback channel is obtained before, during, or after emitting the audio from the one or more speakers.

12. A computer-implemented method of audio device testing comprising:

receiving audio signals captured at one or more microphones of an audio device;

generating at least one virtual audio device data package of the audio device comprising generating device specific audio characteristic data based on the audio signals, wherein the device specific audio characteristic data comprises loopback impulse responses generated by obtaining audio data from a loopback channel; and providing the virtual audio device data package to a simulation unit;

accessing a database including a plurality of acoustic characteristic sets, representing a plurality of corresponding acoustic environments;

generating, by the simulation unit, a plurality of simulated audio outputs that each simulate audio output based on corresponding sets of the plurality of acoustic characteristic sets.

13. The method of claim 12 wherein a recording of audio including the audio signal and used to generate the device specific audio characteristic data comprises a recorded sequence with at least one pure tone part, at least one maximum length sequence (MLS) part, and at least one sweep sine sequence part.

14. The method of claim 13 wherein the recording of audio comprises at least one sequence of intended silence.

15. The method of claim 12 wherein the device specific audio characteristic data comprises at least two of: (1) self-noise data related to self-noise of the audio device, (2) capture echo impulse response data related to linear impulse responses determined by emitting audio from one or more speakers of the audio device and received by one or more microphones on the audio device, (3) non-linear distortion profiles of audio emitted from one or more speakers on the audio device and captured at the audio device, and (4) the loopback impulse responses generated by obtaining audio data from a loopback channel rather than data of the audio signal as obtained over the air through microphones.

16. The method of claim 12 comprising transmitting the virtual audio device data package to a location remote from a location having the audio device; and using the virtual audio device data package to generate simulated output as if the audio device is being physically placed in multiple different audio rooms each with different acoustic characteristics.

17. The method of claim 12 comprising inputting at least some data types of the virtual audio device data package into a simulation tool to generate simulated output to be in response at least to audio emitted from speakers of the audio device; and inputting a different combination of the data types into a simulation tool to generate simulated output to be in response to audio emitted from speakers external of the audio device.

18. The method of claim 17 wherein the loopback impulse responses and echo impulse responses of the virtual audio device data package are arranged to be input to the simulation unit to generate simulated output to be in response to audio emitted from speakers on the audio device.

19. The method of claim 12 wherein the virtual audio device data package comprises clock drift parameter data.

20. A computer-implemented system of audio device evaluation comprising:

memory to store at least audio signals captured by one or more microphones of an audio device;

processor circuitry communicatively coupled to the memory and being arranged to operate by:

generating at least one virtual audio device data package of the audio device comprising generating device specific audio characteristic data by using the audio signals based on the audio signals, wherein the device specific audio characteristic data comprises loopback impulse responses generated by obtaining audio data from a loopback channel; and providing the virtual audio device data package to a simulation unit;

accessing a database including a plurality of acoustic characteristic sets, representing a plurality of corresponding acoustic environments;

generating a plurality of simulated audio outputs that each simulate audio output based on corresponding sets of the plurality of acoustic characteristic sets.

21. The system of claim 20 wherein the device specific audio characteristic data comprises at least two of: (1) self-noise data related to self-noise of the audio device, (2) capture echo impulse response data related to linear impulse responses determined by emitting audio from one or more speakers of the audio device and received by one or more microphones on the audio device, (3) non-linear distortion profiles of audio emitted from one or more speakers on the audio device and captured at the audio device, and (4) the loopback data obtained by generating impulse responses of audio data obtained from a loopback channel rather than data of the audio signal as obtained over the air through microphones.

22. The system of claim 20 wherein the virtual audio device data package comprises self-noise data related to self-noise of the audio device while the audio device is in an anechoic chamber.

23. The system of claim 22 wherein the audio device is arranged to record audio while no device is playing audio.

24. The system of claim 22 wherein the audio device is arranged to record audio while audio is being emitted with a sequence that is silent in addition to other sequences that are not silent.

25. The system of claim 20 wherein the virtual audio device data package comprises both linear echo impulse response data and non-linear distortion profiles both being associated with audio emitted from the audio device.

* * * * *